(12) United States Patent
Bittner et al.

(10) Patent No.: US 9,657,137 B2
(45) Date of Patent: May 23, 2017

(54) PROCESS FOR PREPARING A MACROMONOMER

(71) Applicant: BASF SE, Ludwigshafen (DE)

(72) Inventors: Christian Bittner, Bensheim (DE); Björn Langlotz, Trostberg (DE); Benjamin Wenzke, Hamburg (DE); Christian Spindler, Houston, TX (US); Roland Reichenbach-Klinke, Traunstein (DE); Markus Klumpe, Mannheim (DE); Nicole Meier, Mannheim (DE); Ulrich Annen, Haßloch (DE); Thomas Ostrowski, Mannheim (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 14/652,244

(22) PCT Filed: Dec. 13, 2013

(86) PCT No.: PCT/EP2013/076499
§ 371 (c)(1),
(2) Date: Jun. 15, 2015

(87) PCT Pub. No.: WO2014/095608
PCT Pub. Date: Jun. 26, 2014

(65) Prior Publication Data
US 2015/0329669 A1 Nov. 19, 2015

(30) Foreign Application Priority Data

Dec. 17, 2012 (EP) ..................... 12197538

(51) Int. Cl.
*C08G 65/26* (2006.01)
*C08F 216/14* (2006.01)
*C08F 290/06* (2006.01)

(52) U.S. Cl.
CPC .... *C08G 65/2696* (2013.01); *C08F 216/1416* (2013.01); *C08F 290/062* (2013.01); *C08G 65/2609* (2013.01); *C08G 65/2648* (2013.01); *C08F 2216/1425* (2013.01); *C08G 2650/36* (2013.01)

(58) Field of Classification Search
None
See application file for complete search history.

(56) References Cited

U.S. PATENT DOCUMENTS

| 5,086,142 | A | 2/1992 | Fock et al. |
| 5,741,947 | A | 4/1998 | Wolf et al. |
| 7,238,760 | B2 | 7/2007 | Schinabeck et al. |
| 7,605,196 | B2 | 10/2009 | Schinabeck et al. |
| 8,399,608 | B2 | 3/2013 | Grosch et al. |
| 2005/0170991 | A1 | 8/2005 | Ruland et al. |
| 2012/0129739 | A1 | 5/2012 | Pfeuffer et al. |

FOREIGN PATENT DOCUMENTS

| CA | 2760734 | * | 11/2010 |
| CA | 2760734 | A1 | 11/2010 |
| CA | 2817792 | A1 | 5/2012 |
| CA | 2826635 | A1 | 10/2012 |
| CN | 102146159 | A | 8/2011 |
| CN | 102146159 | A * | 8/2011 |
| CN | 102439054 | A | 5/2012 |
| DE | 4325237 | A1 | 2/1995 |
| DE | 100 37 629 | A1 | 2/2002 |
| DE | 10243361 | A1 | 4/2004 |
| DE | 10 2004 032 304 | A1 | 2/2006 |
| EP | 705 854 | A1 | 4/1996 |
| EP | 2287216 | A1 | 2/2011 |
| WO | WO-2009052864 | A1 | 4/2009 |
| WO | WO-2010133527 | A2 | 11/2010 |
| WO | WO-2011/015520 | A1 | 2/2011 |
| WO | WO-2012069477 | A1 | 5/2012 |
| WO | WO-2012069942 | A1 | 5/2012 |
| WO | WO-2012136613 | A1 | 10/2012 |

OTHER PUBLICATIONS

Taylor, K.C., et al., "Water-soluble Hydrophobically Associating Polymers for Improved Oil Recovery: A literature Review", Journal of Petroleum Science $ Engineering, vol. 19, (1998), pp. 265-280.
International Search Report for PCT/EP2013/076499 mailed Oct. 28, 2014.

* cited by examiner

*Primary Examiner* — Rosalynd Keys
(74) *Attorney, Agent, or Firm* — Drinker Biddle & Reath LLP

(57) ABSTRACT

The present invention relates to a process for preparing hydrophobically associating macromonomers M and to the novel macromonomers prepared by means of the process according to the invention. The macromonomers M comprise a copolymerizable, ethylenically unsaturated group and a polyether structure in block form, the latter consisting of a polyethyleneoxy block and a hydrophobic polyalkyleneoxy block consisting of alkyleneoxy units having at least 4 carbon atoms. Optionally, the macromonomers M may have a terminal polyethyleneoxy block. The macromonomers prepared by the process according to the invention are suitable for reaction with further monomers, especially with acrylamide, to give a water-soluble, hydrophobically associating copolymer.

18 Claims, No Drawings

PROCESS FOR PREPARING A MACROMONOMER

CROSS-REFERENCE TO RELATED APPLICATIONS

This application is a national stage application (under 35 U.S.C. §371) of PCT/EP2013/076499, filed Dec. 13, 2013, which claims benefit of European Application No. 12197538.7, filed Dec. 17, 2012, both of which are incorporated herein by reference in their entirety.

The present invention relates to a process for preparing hydrophobically associating macromonomers M and to the novel macromonomers prepared by means of the process according to the invention. The macromonomers M comprise a copolymerizable, ethylenically unsaturated group and a polyether structure in block form, the latter consisting of a polyethyleneoxy block and a hydrophobic polyalkyleneoxy block consisting of alkyleneoxy units having at least 4 carbon atoms. Optionally, the macromonomers M may have a terminal polyethyleneoxy block. The macromonomers prepared by the process according to the invention are suitable for reaction with further monomers, especially with acrylamide, to give a water-soluble, hydrophobically associating copolymer.

Water-soluble thickening polymers are used in many fields of industry, for example in the cosmetics sector, in foods, for production of cleaning products, printing inks and emulsion paints, and in oil production. Many chemically different classes of polymers usable as thickeners are known. An important class of thickening polymers is that of what are called hydrophobically associating polymers. This is understood by those skilled in the art to mean water-soluble polymers having lateral or terminal hydrophobic groups, for example relatively long alkyl chains. In aqueous solution, such hydrophobic groups can associate with themselves or with other substances having hydrophobic groups. This forms an associative network, which thickens the medium.

EP 705 854 A1. DE 100 37 629 A1 and DE 10 2004 032 304 A1 disclose water-soluble, hydrophobically associating copolymers and the use thereof, for example in the construction chemistry sector. The copolymers described comprise acidic, basic or cationic monomers which impart water solubility to the polymers. As hydrophobically associating monomers, the copolymers disclosed each comprise monomers of the following type: $H_2C=C(R^x)-COO-(-CH_2-CH_2-O-)q-R^y$ or else $H_2C=C(R^x)-O-(-CH_2-CH_2-O-)q-R^y$ where $R^x$ is typically H or $CH_3$ and $R^y$ is a relatively large hydrocarbyl radical, typically hydrocarbyl radicals having 8 to 40 carbon atoms.

Additionally known is the use of hydrophobically associating copolymers in the mineral oil production sector, especially for tertiary mineral oil production (enhanced oil recovery, EOR). Details of the use of hydrophobically associating copolymers for tertiary mineral oil production are described, for example, in the review article by Taylor. K. C. and Nasr-El-Din. H. A. in J. Petr. Sci. Eng. 1998, 19, 265-280.

The techniques of tertiary mineral oil production include what is called "polymer flooding". A mineral oil deposit is not an underground "sea of oil"; instead, the mineral oil is held in tiny pores in the oil-bearing rock. The diameter of the cavities in the formation is typically only a few micrometers. For polymer flooding, an aqueous solution of a thickening polymer is injected through injection wells into a mineral oil deposit. The injection of the polymer solution forces the mineral oil through said cavities in the formation from the injection well proceeding in the direction of the production well, and the mineral oil is produced through the production well.

It is important for this application that the aqueous polymer solution does not comprise any gel particles whatsoever. Even small gel particles having dimensions in the micrometer range can block the fine pores in the formation and thus stop the production of mineral oil. Hydrophobically associating copolymers for tertiary mineral oil production should therefore have a minimum proportion of gel particles. In addition, the copolymers should have good thickening action, meaning that a maximum viscosity of the generally aqueous copolymer solutions is desirable.

WO 2010/133527 describes the preparation of hydrophobically associating monomers of the $H_2C=C(R^1)-R^4-O-(-CH_2-CH(R^2)-O-)_k-(-CH_2-CH(R^3)-O-)_l-R^5$ type and the subsequent reaction with further hydrophilic monomers to give copolymers. The macromonomers described have an ethylenically unsaturated group and a polyether block structure consisting of a hydrophilic polyalkyleneoxy block consisting essentially of ethyleneoxy units and of a terminal hydrophobic polyalkyleneoxy block consisting of alkyleneoxy units having at least 4 carbon atoms.

The document WO 2011/015520 describes the copolymerization of such macromonomers in the presence of nonionic surfactants and the use of the copolymers formed for polymer flooding.

The document CN 102146159 likewise describes a process for preparing a polyvinyl ether monomer, the polyether monomer having the general formula $H_2C=C(R^2)-O-R^1-O-(-C_aH_{2a}O)_n-(-C_bH_{2b}O)_m-H$ where a and b are each integers from 2 to 4, a does not equal b, and $R_1$ is a $C_1$-$C_8$-alkylene group. The monomers described in this document have a polyalkyleneoxy block formed from ethylene oxide, propylene oxide and/or butylene oxide. The alkoxylation is preferably performed at a temperature in the range from 120 to 160° C. with addition of an alkaline catalyst, for example potassium methoxide.

For preparation of the macromonomers, the process according to WO 2010/133527 proceeds from suitable monoethylenically unsaturated alcohols, which are subsequently alkoxylated in a two-stage process, such that the block structure mentioned is obtained. First of all, alkoxylation is effected with ethylene oxide, optionally in a mixture with propylene oxide and/or butylene oxide. In a second step, alkoxylation is effected with alkylene oxides having at least 4 carbon atoms. The examples in WO 2010/133527 describe the performance of the alkoxylation using KOMe (potassium methoxide) as a catalyst at a reaction temperature of 140° C., the concentration of potassium ions being above 3 mol %.

The alkoxylation reaction is frequently performed under base catalysis. Also known in general terms are acid-catalyzed alkoxylation using Brønsted or Lewis acids, or catalytic alkoxylation, for example using mixed hydroxides (e.g. DE 43 25 237 A1) or double metal cyanide catalysts (e.g. DE 102 43 361 A1).

In the case of base-catalyzed alkoxylation, the alcohol used as the starting material is typically admixed with alkali metal hydroxides or alkali metal alkoxides in a pressure reactor and converted to the corresponding alkoxide. Subsequently, usually under inert gas atmosphere, the alkylene oxides are metered in, for example in a plurality of steps. In order to control the reaction and avoid oversaturation of the reaction mixture with alkylene oxide, it is usually necessary to maintain particular pressure and temperature ranges in the alkoxylation.

The process according to WO 2010/133527 is said to avoid the formation of crosslinking by-products, and so the preparation of copolymers with a low gel content is said to be possible. It has been found, however, that the prior art preparation processes do not constitute a reliable method for preparation of hydrophobically associating copolymers with a low gel content. Fluctuating copolymer qualities have been found, for example in the event of variation of pressure and reaction time in the alkoxylation steps, such that sometimes highly crosslinked copolymer products have been obtained.

It was therefore an object of the invention to provide a process with which hydrophobically associating macromonomers can reliably be prepared, these having few crosslinking groups and being polymerizable to give copolymers with low gel contents. The process is additionally to be simple and inexpensive to perform and is to meet safety demands with sufficient economic viability (for example sufficiently short reaction times).

It has been found that, in prior art processes, monomers having two ethylenically unsaturated groups are probably formed as a by-product. These by-products can typically be detected by analysis with difficulty. The crosslinking bifunctional by-products occur typically in very small proportions of less than 1 mol % and generally have molecular weight distributions very similar to those of the products. Therefore, the removal of these by-products and purification of the product are generally impossible. These bifunctional by-products have a crosslinking effect and lead to increased gel formation, even in low concentrations in the copolymerization. Copolymers with a gel content are generally no longer filterable and no longer usable for injection into porous matrices in mineral oil deposits.

A possible scheme for the formation of crosslinking compounds is shown below:

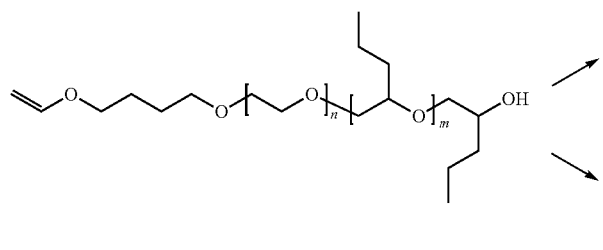

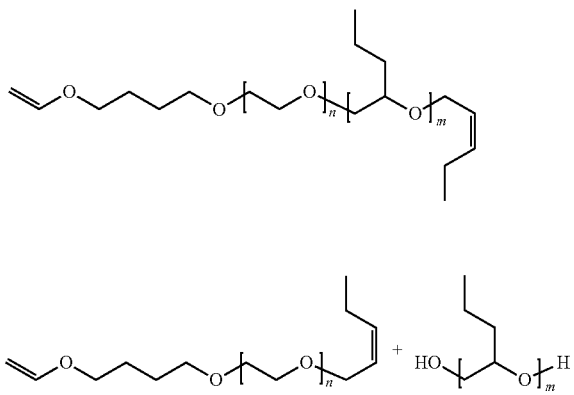

where n, for instance, may be a number from 10 to 150 and m a number from 5 to 24. It may be presumed that, for example, elimination of water or chain breakage results in the formation of a double bond. In both cases, compounds having two double bonds are formed, i.e. crosslinking compounds. It has been found that occurrence of these unwanted side reactions increases with temperature and duration of the reaction.

There is a standard preference for KOMe (potassium methoxide) as a basic catalyst over NaOMe (sodium methoxide), since KOMe is more strongly basic than NaOMe, and therefore the alkoxylation reaction proceeds more quickly. It has been found, however, that the more strongly basic KOMe promotes the above-described eliminations. Pentylene oxide and/or butylene oxide react much more slowly than ethylene oxide; therefore, the elimination side reactions in the case of alkoxylation with pentylene oxide and/or butylene oxide have a much more distinct effect.

It has now been found that, surprisingly, the formation of crosslinking bifunctional compounds and hence the gel content in the resulting copolymers can be reduced or virtually completely avoided when a critical amount of potassium ions less than or equal to 0.9 mol % and a temperature less than or equal to 135° C. is observed in the second alkoxylation step (reaction with pentylene oxide and/or butylene oxide). It has additionally been found that the preparation process according to the invention, with the given safety demands relating to chemistry and operation (more particularly a pressure less than 2.1 bar in the alkoxylation with pentylene oxide and more particularly a pressure of less than 3.1 bar in the alkoxylation with butylene oxide), ensures good reproducibility with reasonable reaction time.

The present invention relates to a process for preparing a macromonomer M of the general formula (I)

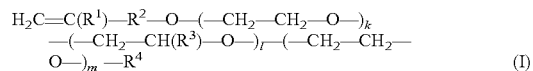

where the $-(-CH_2-CH_2-O-)_k$ and $-(-CH_2-CH(R^3)-O-)_l$ and optionally $-(-CH_2-CH_2-O-)_m$ units are arranged in block structure in the sequence shown in formula (I);

where the radicals and indices are each defined as follows:

k: is a number from 10 to 150, preferably from 10 to 50, more preferably from 15 to 35, most preferably from 23 to 26;

l: is a number from 5 to 25, preferably from 7 to 18, especially preferably from 8.5 to 17.25;

m: is a number from 0 to 15, preferably from 0 to 10, preferably 0 to 5, especially preferably from 0.1 to 10, more preferably from 0.5 to 10, more preferably 0.5 to 5;

$R^1$: is H or methyl;

$R^2$: is independently a single bond or a divalent linking group selected from the group consisting of $-(C_nH_{2n})-$ and $-O-(C_nH_{2n'})-$, where n is a natural number from 1 to 6 and n' is a natural number from 2 to 6;

R³: independently a hydrocarbyl radical having at least 2 carbon atoms, preferably having 2 to 14, especially preferably having 2 to 4, carbon atoms, more preferably ethyl and/or n-propyl, or an ether group of the general formula —CH$_2$—O—R³' where R³' is a hydrocarbyl radical having at least 2 carbon atoms;

R⁴: independently H or a hydrocarbyl radical having 1 to 4 carbon atoms;

comprising the steps of a) reacting a monoethylenically unsaturated alcohol A1 of the general formula (II)

b)

$$H_2C=C(R^1)-R^2-OH \quad (II)$$

with ethylene oxide, where the R¹ and R² radicals are each as defined above;
with addition of an alkaline catalyst C1 comprising KOMe and/or NaOMe;
to obtain an alkoxylated alcohol A2;

b) reacting the alkoxylated alcohol A2 with at least one alkylene oxide Z of the formula (Z)

$$\overset{O}{\underset{R^3}{\triangle}} \quad (Z)$$

where R³ is as defined above;
with addition of an alkaline catalyst C2;
where the concentration of potassium ions in the reaction in step b) is less than or equal to 0.9 mol %, preferably less than 0.9 mol %, preferably in the range from 0.01 to 0.9 mol %, especially preferably 0.01 to 0.5 mol %, based on the alcohol A2 used;
and where the reaction in step b) is performed at a temperature of less than or equal to 135° C., preferably of less than 135° C., more preferably of less than or equal to 130° C.;
to obtain an alkoxylated alcohol A3 of the formula (III)

$$H_2C=C(R^1)-R^2-O-(-CH_2-CH_2-O-)_k \\ -(-CH_2-CH(R^3)-O-)_l-R^4 \quad (III)$$

where R⁴=H, where the R¹, R² and R³ radicals and the indices k and l are each as defined above;

c) optionally reacting at least a portion of the alkoxylated alcohol A3 with ethylene oxide to obtain an alkoxylated alcohol A4 corresponding to the macromonomer M of the formula (I) where R⁴=H and m is greater than 0;

d) optionally etherifying the alkoxylated alcohol A3 and/or A4 with a compound

R⁴—X where R⁴ is as defined above and X is a leaving group, preferably selected from Cl, Br, I, —O—SO$_2$—CH$_3$ (mesylate), —O—SO$_2$—CF$_3$ (triflate), and —O—SO$_2$—OR⁴;
to obtain a macromonomer M of the formula (I) and/or (III) where R⁴=hydrocarbyl radical having 1 to 4 carbon atoms.

The invention relates to the above described inventive process for preparing a macromonomer M of the general formula (I), wherein k is a number from 10 to 150, preferably from 10 to 50, more preferably from 15 to 35, especially preferably from 20 to 28, most preferably from 23 to 26.

In a further embodiment the invention relates to the above described inventive process, with l: is a number from 5 to 30, preferably from 5 to 28, preferably from 5 to 25, preferably from 7 to 23, more preferably from 7 to 18, especially preferably from 8.5 to 17.25.

The present invention further relates to a macromonomer obtainable by the process according to the invention. The inventive macromonomer M can be copolymerized with at least one monoethylenically unsaturated, hydrophilic monomer (b) and imparts hydrophobically associating properties to the resulting copolymer. It is therefore also referred to hereinafter as hydrophobically associating macromonomer M.

Step a) of the process according to the invention comprises the reaction of a monoethylenically unsaturated alcohol A1 with ethylene oxide, with addition of an alkaline catalyst C1 comprising KOMe (potassium methoxide) and/or NaOMe (sodium methoxide), to obtain an alkoxylated alcohol A2.

The preferred conditions specified hereinafter (for example pressure and/or temperature ranges) in the reactions in step a), b), c) and/or d) mean that the respective step is performed wholly or partly under the given conditions.

Step a) preferably first comprises the reaction of the monoethylenically unsaturated alcohol A1 with the alkaline catalyst C1. Typically, the alcohol A1 used as the starting material for this purpose is admixed in a pressure reactor with an alkaline catalyst C1. Reduced pressure of typically less than 100 mbar, preferably in the range from 50 to 100 mbar and/or elevated temperature typically in the range from 30 to 150° C. allow water and/or low boilers still present in the mixture to be drawn off. Thereafter, the alcohol is present essentially in the form of the corresponding alkoxide. Subsequently, the reaction mixture is typically treated with inert gas (e.g. nitrogen).

In particular reduced pressure of typically less than 100 mbar, preferably in the range from 30 to 100 mbar and/or elevated temperature typically in the range from 30 to 150° C. allow water and/or low boilers still present in the mixture to be drawn off.

Step a) preferably comprises the addition of ethylene oxide to the a mixture of alcohol A1 and alkaline catalyst C1 (as described above). After the addition of the ethylene oxide has ended, the reaction mixture is typically allowed to react further. The addition and/or further reaction is effected typically over a period of 2 to 36 h, preferably of 5 to 24 h, especially preferably of 5 to 15 h, more preferably of 5 to 10 h.

The further reaction is typically effected over a period of 0.5 to 1 h. The addition inclusive the optional decompression (i.e. the intermediate decompression of the pressure from for example 6 bar to for example 3 bar absolute) and inclusive the further reaction is effected typically over a period of 2 to 36 h, preferably of 5 to 24 h, especially preferably of 5 to 15 h, more preferably of 5 to 10 h.

Step a) is effected typically at temperatures of 60 to 180° C., preferably of 130 to 150° C., more preferably of 140 to 150° C. More particularly, step a) comprises the addition of ethylene oxide to the mixture of alcohol A1 and alkaline catalyst C1 at a temperature of 60 to 180° C., preferably of 130 to 150° C., more preferably of 140 to 150° C.

The ethylene oxide is preferably added to the mixture of alcohol A1 and alkaline catalyst C1 at a pressure in the range from 1 to 7 bar, preferably in the range from 1 to 5 bar. In order to satisfy the safety conditions, the addition in step a) is typically performed at a pressure in the range from 1 to 3.1 bar, preferably 1 to 2.1 bar. More particularly, the addition of ethylene oxide and/or the further reaction are performed at the abovementioned pressures.

The ethylene oxide is preferably added to the mixture of alcohol A1 and alkaline catalyst C1 at a pressure in the range from 1 to 7 bar, preferably in the range from 1 to 6 bar. In order to satisfy the safety conditions, the addition in step a) is typically performed at a pressure in the range from 1 to 4 bar, preferably from 1 to 3.9 bar, preferably from 1 to 3.1 bar. More particularly, the addition of ethylene oxide and/or the further reaction are performed at the abovementioned pressures.

Step a) preferably comprises the addition of ethylene oxide to a mixture of alcohol A1 and alkaline catalyst C1 over a period of less than or equal to 36 h, preferably less than or equal to 32 h, more preferably over a period of 2 to 32 h, especially preferably over a period of 5 to 15 h, and at a pressure of less than or equal to 5 bar, preferably at 1 to 3.1 bar, especially preferably 1 to 2.1 bar. More particularly, the above-specified period comprises the addition of ethylene oxide and/or the further reaction.

Step a) preferably comprises the addition of ethylene oxide to a mixture of alcohol A1 and alkaline catalyst C1 over a period of less than or equal to 36 h, preferably less than or equal to 32 h, more preferably over a period of 2 to 32 h, especially preferably over a period of 5 to 15 h, and at a pressure of less than or equal to 5 bar, preferably at 1 to 4 bar, preferably at 1 to 3.9 bar, preferably at 1 to 3.1 bar. More particularly, the above-specified period comprises the addition of ethylene oxide and/or the further reaction.

More particularly, the reaction of a monoethylenically unsaturated alcohol A1 with ethylene oxide, with addition of an alkaline catalyst C1 comprising KOMe (potassium methoxide) and/or sodium methoxide (NaOMe), in step a) of the process according to the invention can be effected in one or more ethoxylation steps. Preference is given to a process as described above wherein step a) comprises the following steps:
  reaction of the monoethylenically unsaturated alcohol A1 with the alkaline catalyst C1
  reaction of the mixture of alcohol A1 and catalyst C1 with a portion of the ethylene oxide, especially 10 to 50% by weight, especially 10 to 30% by weight, of the total amount of ethylene oxide,
  an intermediate step comprising a rest phase and/or a decompression,
  and the reaction with the remaining portion of the ethylene oxide.

Preference is further given to a process as described above wherein step a) comprises the following steps:
  reaction of the monoethylenically unsaturated alcohol A1 with the alkaline catalyst C1,
  reaction of the mixture of alcohol A1 and catalyst C1 with a portion of the ethylene oxide, especially 50 to 98% by weight, especially 80 to 98% by weight, of the total amount of ethylene oxide,
  a step for removal of low boilers, with decompression to a pressure less than 100 mbar, preferably from 50 to 100 mbar, especially preferably from 30 to 100 mbar and/or elevated temperature, typically within the range from 30 to 150° C.,
  reaction of the resulting ethoxylation product with the alkaline catalyst C1 and reaction of the remaining portion of the ethylene oxide with the mixture of ethoxylation product and alkaline catalyst C1.

The alkaline catalyst C1 comprises especially 10 to 100% by weight, preferably 20 to 90% by weight, of KOMe and/or NaOMe. The catalyst C1 may, as well as KOMe and/or NaOMe, comprise further alkaline compounds and/or a solvent (especially a C1 to C6 alcohol). For example, a further alkaline compound may be present, selected from alkali metal hydroxides, alkaline earth metal hydroxides, C2 to C6 potassium alkoxides, C2 to C6 sodium alkoxides (preferably ethoxide), alkaline earth metal alkoxides (especially C1 to C6 alkoxides, preferably methoxide and/or ethoxide). The catalyst C1 preferably comprises, as well as KOMe and/or NaOMe, at least one further alkaline compound selected from sodium hydroxide and potassium hydroxide. In another preferred embodiment, the alkaline catalyst C1 consists of KOMe or of a solution of KOMe in methanol (MeOH). Typically, it is possible to use a solution of 20 to 50% by weight of KOMe in methanol (MeOH). In another preferred embodiment, the alkaline catalyst C1 consists of NaOMe or of a solution of NaOMe in methanol. In a further preferred embodiment, the catalyst C1 consists of a mixture of KOMe and NaOMe or a solution of KOMe and NaOMe in methanol.

It is advantageous to use the catalyst C1 in such an amount that an upper limit of 2500 ppm (approx. 0.4 mol %) of KOMe is maintained in relation to the alcohol A1 used, in order to avoid the decomposition of the monoethylenically unsaturated alcohol A1. The concentration of potassium ions in step a) is preferably less than or equal to 0.4 mol % based on the total amount of the alcohol A1 used, more preferably 0.1 to 0.4 mol %.

If KOMe is used in such an amount that the concentration is more than 0.9 mol % based on the alkoxylated alcohol A2 (product of process step a)), KOMe has to be fully or partly removed prior to step b), in order to obtain a potassium ion concentration of less than 0.9 mol % in process step b). This can be effected, for example, by isolating and optionally purifying the alkoxylated alcohol A2 after step a).

In a further preferred embodiment, KOMe is used in such an amount that the concentration of potassium ions after the reaction in step a) is already less than or equal to 0.9 mol % based on A2.

Step b) of the process according to the invention comprises the reaction of the alkoxylated alcohol A2 with at least one alkylene oxide Z, with addition of an alkaline catalyst C2, to obtain an alkoxylated alcohol A3 of the formula (III)

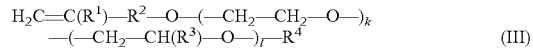
(III)

where $R^4$=H, where the $R^1$, $R^2$ and $R^3$ radicals and the indices k and l are each as defined above.

Step b) preferably first comprises the reaction of the alkoxylated alcohol A2 with the alkaline catalyst C2. Typically, the alcohol A2, for this purpose, is admixed in a pressure reactor with the alkaline catalyst C2. Reduced pressure of typically less than 100 mbar, preferably in the range from 50 to 100 mbar, especially preferably from 30 to 100 mbar, and/or elevated temperature typically in the range from 30 to 150° C. allow water and/or low boilers still present in the mixture to be drawn off. Thereafter, the alcohol is present essentially in the form of the corresponding alkoxide. Subsequently, the reaction mixture is typically treated with inert gas (e.g. nitrogen).

Step b) preferably comprises the addition of the at least one alkylene oxide Z to the above-described mixture of alcohol A2 and alkaline catalyst C2. After the addition of the alkylene oxide Z has ended, the reaction mixture is typically allowed to react further. The addition and/or further reaction is effected typically over a period of 2 to 36 h, preferably of 5 to 24 h, especially preferably of 5 to 20 h, more preferably of 5 to 15 h. Particularly the addition inclusive the optional decompression and inclusive the further reaction is effected typically over a period of 2 to 36 h, preferably of 5 to 30 h, especially preferably of 10 to 28 h, more preferably of 11 to 24 h.

According to the invention, the concentration of potassium ions in the reaction in step b) is less than or equal to 0.9 mol %, preferably less than 0.9 mol %, preferably from 0.01 to 0.9 mol %, more preferably from 0.1 to 0.6 mol %, based on the alcohol A2 used. In a preferred embodiment, the concentration of potassium ions in the reaction in step b) is 0.01 to 0.5 mol %, based on the alcohol A2 used.

In a particularly preferred embodiment, the concentration of potassium ions in the reaction in step b) is less than or equal to 0.9 mol %, preferably 0.1 to 0.5 mol %, based on the alcohol A2 used, and the reaction in step b) is performed at temperatures of 120 to 130° C.

The alkaline catalyst C2 preferably comprises at least one alkaline compound selected from alkali metal hydroxides, alkaline earth metal hydroxides, alkali metal alkoxides (especially C1 to C6 alkoxides, preferably methoxide and/or ethoxide), alkaline earth metal alkoxides (especially C1 to C6 alkoxides, preferably methoxide and/or ethoxide). The catalyst C2 preferably comprises at least one basic sodium compound, especially selected from NaOH, NaOMe and NaOEt, more preferably NaOMe or NaOH. The catalyst C2 used may be a mixture of the alkaline compounds mentioned; the catalyst C2 preferably consists of one of the basic compounds mentioned or mixtures of the alkaline compounds mentioned. Frequently, an aqueous solution of the alkaline compounds is used. In another preferred embodiment, the alkaline catalyst C2 consists of NaOMe or of a solution of NaOMe in methanol (MeOH). Typically, a solution of 20 to 50% by weight NaOMe in methanol (MeOH) may be used. Catalyst C2 preferably does not comprise any KOMe.

Preference is given to using, in step b), a catalyst C2 comprising at least one basic sodium compound, especially selected from NaOH, NaOMe and NaOEt, the concentration of sodium ions in the reaction in step b) being in the range from 3.5 to 12 mol %, preferably from 3.5 to 10 mol %, more preferably from 3.5 to 7 mol %, most preferably from 4 to 5.5 mol %, based on the alcohol A2 used.

According to the invention, the reaction in step b) is performed at a temperature of less than or equal to 135° C., preferably at less than or equal to 130° C. Preference is given to performing the reaction in step b) at temperatures of 60 to 135° C., preferably at 100 to 135° C., more preferably at 120 to 135° C., most preferably at 120 to 130° C. More particularly, step b) comprises the addition of the at least one alkylene oxide Z to a mixture of alcohol A2 and alkaline catalyst C2 at a temperature of less than or equal to 135° C., preferably at less than or equal to 130° C., especially preferably at temperatures of 60 to 135° C., more preferably at 100 to 135° C., more preferably at 120 to 130° C.

Preference is given to performing step b) at a pressure in the range from 1 to 6 bar, preferably from 1 to 3.1 bar, more preferably from 1 to 2.1 bar. Preferably reaction in step b) is performed at a pressure in the range of from 1 to 6 bar, preferably from 1 to 3.1 bar or preferably from 4 to 6 bar if $R^3$ is a hydrocarbyl radical having 2 carbon atoms. More particularly, the addition of alkylene oxide Z and/or the further reaction are performed at the abovementioned pressure.

Preference is given to performing step b) at a pressure in the range from 1 to 3.1 bar, preferably from 1 to 2.1 bar. In order to satisfy the safety conditions, the reaction in step b) is preferably performed at a pressure in the range of less than or equal to 3.1 bar (preferably 1 to 3.1 bar) if $R^3$ is a hydrocarbyl radical having 2 carbon atoms, or at a pressure of less than or equal to 2.1 bar (preferably 1 to 2.1 bar) if $R^3$ is a hydrocarbyl radical having more than 2 carbon atoms. More particularly, the addition of alkylene oxide Z and/or the further reaction are performed at the abovementioned pressure.

Step b) preferably comprises the addition of the at least one alkylene oxide Z to a mixture of alcohol A2 and alkaline catalyst C2 at a pressure in the range of 1 to 3.1 bar, preferably 1 to 2.1 bar. Preferably, $R^3$ is a hydrocarbyl radical having 2 carbon atoms and step b) comprises the addition of the at least one alkylene oxide Z to a mixture of alcohol A2 and alkaline catalyst C2 at a pressure in the range from 1 to 3.1 bar; or, preferably, $R^3$ is a hydrocarbyl radical having at least 3 carbon atoms (preferably having 3 carbon atoms) and step b) comprises the addition of the at least one alkylene oxide Z to a mixture of alcohol A2 and alkaline catalyst C2 at a pressure in the range from 1 to 2.1 bar.

Particular preference is given to performing step b) at a pressure in the range from 1 to 3.1 bar (preferably at the abovementioned pressures) and at a temperature of 120 to 130° C.

Step b) preferably comprises the addition of the at least one alkylene oxide Z to a mixture of alcohol A2 and alkaline catalyst C2 over a period of less than or equal to 36 h, preferably less than or equal to 32 h, more preferably over a period of 2 to 32 h, more preferably over a period of 11 to 24 h, most preferably over a period of 5 to 24 h, and at a pressure of less than or equal to 3.1 bar (preferably at the abovementioned pressures).

The process according to the invention may optionally comprise step c), wherein at least a portion of the alkoxylated alcohol A3 is reacted with ethylene oxide to obtain an alkoxylated alcohol A4 which corresponds to the macromonomer M of the formula (I) where $R^4$=H and m is greater than 0 (preferably 0.1 to 15, more preferably 0.1 to 10, especially preferably 0.5 to 5). In a preferred embodiment, step c) comprises the reaction of all of the alkoxylated alcohol A3 with ethylene oxide.

According to a preferred embodiment of the invention the process comprises step c), wherein at least a portion of the alkoxylated alcohol A3 (preferably all of the alkoxylated alcohol A3) is reacted with ethylene oxide to obtain an alkoxylated alcohol A4 which corresponds to the macromonomer M of the formula (I) where $R^4$=H and m is a number from 0.1 to 15, preferably from 0.1 to 10, more preferably from 0.5 to 10, especially preferably from 1 to 7, further preferably from 2 to 5.

The optional step c) is especially effected without further addition of an alkaline catalyst. The optional step c) is especially performed at a pressure in the range from 1 to 7 bar, preferably from 1 to 5 bar, and a temperature in the range from 60 to 140° C., preferably from 120 to 140° C., more preferably from 125 to 135° C. The ethoxylation in the optional step c) is especially effected over a period of 0.5 to 7 h, especially 0.5 to 5 h, preferably of 0.5 to 4 h.

The optional step c) is especially effected without further addition of an alkaline catalyst. The optional step c) is especially performed at a pressure in the range from 1 to 7 bar, preferably from 1 to 6 bar, and a temperature in the range from 60 to 140° C., preferably from 120 to 140° C., more preferably from 120 to 135° C. The ethoxylation in the optional step c) is especially effected over a period of 0.5 to 7 h, especially of 1 to 5 h, preferably of 1 to 4 h.

The optional step c) preferably comprises the addition of ethylene oxide to the reaction mixture after step b), comprising the alkoxylated alcohol A3 of the formula (III) without further workup and/or decompression. After the addition of the ethylene oxide has ended, the reaction mixture is typically allowed to react further. The addition and/or further reaction is effected typically over a period of 0.5 to 10 h, especially 0.5 to 7, especially 0.5 to 5 h, preferably of 0.5 to 4 h. Particularly the addition inclusive the optional decompression and inclusive the further reaction is effected typically over a period of 0.5 to 10 h, preferably of 2 to 10 h, especially preferably of 4 to 8 h.

The effect of performance of the optional step c), i.e. of a final ethoxylation, may be that alkylene oxide Z still present in the reaction mixture after step b) is depleted and removed.

It is additionally possible to remove alkylene oxide Z which has not been depleted after step b) by a decompression and/or temperature increase after step b).

The process according to the invention may optionally comprise step d), wherein the alkoxylated alcohol A3 and/or A4 is etherified with a compound $R^4$—X where X is a leaving group, preferably selected from Cl, Br, I, —O—SO$_2$—CH$_3$ (mesylate), —O—SO$_2$—CF$_3$ (triflate), and —O—SO$_2$—OR$^4$. If the alkoxylated alcohol A3 of the formula (I) is to be etherified with a terminal OH group (i.e. $R^4$=H), this can be accomplished with the customary alkylating agents known in principle to those skilled in the art, for example alkyl sulfates and/or alkyl halides. The compound $R^4$—X may typically comprise alkyl halides. For the etherification, it is also possible to use especially dimethyl sulfate or diethyl sulfate. Etherification is just one option which can be selected by the person skilled in the art according to the desired properties of the copolymer.

In the inventive macromonomers M of the formula (I), an ethylenic group $H_2C=C(R^1)$— is bonded via a divalent linking group —$R^2$—O— to a polyalkyleneoxy radical in block structure —(—CH$_2$—CH$_2$—O—)$_k$—(—CH$_2$—CH(R$^3$)—O—)$_l$—$R^4$, where the two blocks —(—CH$_2$—CH$_2$—O—)$_k$ and —(—CH$_2$—CH(R$^3$)—O—)$_l$ are arranged in the sequence shown in formula (I). Optionally, the macromonomer M of the formula (I) may have a further polyethyleneoxy block —(—CH$_2$—CH$_2$—O—)$_m$. The terminal polyalkyleneoxy radical —(—CH$_2$—CH(R$^3$)—O—)$_l$ or —(—CH$_2$—CH$_2$—O—)$_m$ has either a terminal OH group or a terminal ether group —OR$^4$.

It will be apparent to the person skilled in the art in the field of polyalkylene oxides that the orientation of the hydrocarbyl radicals $R^3$ may depend on the conditions in the alkoxylation, for example on the catalyst selected for the alkoxylation. The alkyleneoxy groups may thus be incorporated into the monomer either in the orientation —(—CH$_2$—CH(R$^3$)—O—) or in the inverse orientation —(—CH(R$^3$)—CH$_2$—O—)—. The representation in formula (I) shall therefore not be regarded as being restricted to a particular orientation of the $R^3$ group.

The linking $R^2$ group especially comprises straight-chain or branched aliphatic acyclic hydrocarbyl groups having 1 to 6 carbon atoms, which are joined either directly or via an ether group —O— to the ethylenic group $H_2C=C(R^1)$—. The —(C$_n$H$_{2n}$)—, and —(C$_n$H$_{2n'}$)— groups are preferably linear aliphatic hydrocarbyl groups.

The $R^2$=(C$_n$H$_{2n}$)— group is preferably a group selected from —CH$_2$—, —CH$_2$—CH$_2$— and —CH$_2$—CH$_2$—CH$_2$—, particular preference being given to a methylene group —CH$_2$—.

The $R^2$=—O—(C$_n$H$_{2n'}$)— group is preferably a group selected from —O—CH$_2$—CH$_2$—, —O—CH$_2$—CH$_2$—CH$_2$— and O—CH$_2$—CH$_2$—CH$_2$—CH$_2$—, particular preference being given to —O—CH$_2$—CH$_2$—CH$_2$—CH$_2$—.

In addition, $R^2$ is more preferably a group selected from —CH$_2$— and —O—CH$_2$—CH$_2$—CH$_2$—CH$_2$—, very particular preference being given to —O—CH$_2$—CH$_2$—CH$_2$—CH$_2$—.

The inventive macromonomers (M) additionally have a polyalkyleneoxy radical consisting of the (—CH$_2$—CH$_2$—O—)$_k$, (—CH$_2$—CH(R$^3$)—O—)$_l$ and optionally —(—CH$_2$—CH$_2$—O—)$_m$ units, where the units are arranged in block structure in the sequence shown in formula (I). The transition between the blocks may be abrupt or else continuous.

The —(—CH$_2$—CH$_2$—O—)$_k$ block is a polyethyleneoxy radical.

The number of alkyleneoxy units k is a number from 10 to 150, preferably 12 to 100, more preferably 15 to 80, even more preferably 23 to 26 and, for example, approx. 24.5. It will be apparent to the person skilled in the art in the field of polyalkylene oxides that the numbers mentioned are mean values of distributions.

In the second, terminal block —(—CH$_2$—CH(R$^3$)—O—)$_l$—, the $R^3$ radicals are each independently hydrocarbyl radicals having at least 2 carbon atoms, preferably 2 to 14 carbon atoms, preferably 2 to 4, and more preferably 2 or 3 carbon atoms. This may be an aliphatic and/or aromatic, linear or branched hydrocarbyl radical. Preference is given to aliphatic radicals. Examples of suitable $R^3$ radicals comprise ethyl, n-propyl, n-butyl, n-pentyl, n-hexyl, n-heptyl, n-octyl, n-nonyl or n-decyl and phenyl. Examples of preferred radicals comprise n-propyl, n-butyl and n-pentyl. $R^3$ is more preferably ethyl and/or n-propyl.

Examples of suitable $R^3$ radicals comprise ethyl, n-propyl, n-butyl, n-pentyl, n-hexyl, n-heptyl, n-octyl, n-nonyl, n-decyl, n-dodecyl, n-tetradecyl and phenyl.

In order to ensure a chosen hydrophobicity of the macromonomers, it has been found that a particular sum total of the carbon atoms in the $R^3$ or $R^{3'}$ radicals is advantageous. If $R^3$ is an ether group —CH$_2$—O—R$^{3'}$, the sum total of the carbon atoms is understood to mean the sum total of the carbon atoms in all hydrocarbyl radicals $R^{3'}$, not including the carbon atom of the —CH$_2$— group in CH$_2$—O—R$^{3'}$.

The sum totals of the carbon atoms in all hydrocarbyl radicals $R^3$ or $R^{3'}$ is preferably in the range from 15 to 60, preferably from 15 to 56, more preferably from 15 to 50, especially preferably from 25.5 to 50, further preferably from 25.5 to 34.5.

The sum totals of the carbon atoms in all hydrocarbyl radicals $R^3$ or $R^{3'}$ is preferably in the range from 25.5 to 34.5.

A preferred embodiment relates to an above-described process for preparing a macromonomer M where $R^3$ is ethyl and l is a number from 7.5 to 30, preferably from 7.5 to 28, preferably from 7.5 to 25, more preferably from 12.75 to 25, especially preferably from 13 to 23, especially preferably from 12.75 to 17.25, for example 14, 16 or 22.

A preferred embodiment relates to an above-described process for preparing a macromonomer M where $R^3$ is ethyl and l is a number from 12.75 to 17.25, especially 13 to 17, for example 14 or 16.

A further preferred embodiment relates to an above-described process for preparing a macromonomer M where $R^3$ is n-propyl and l is a number from 8.5 to 11.5, preferably 9 to 11, for example 10 or 11.

The $R^3$ radicals may additionally be ether groups of the general formula —CH$_2$—O—R$^{3'}$ where $R^{3'}$ is an aliphatic and/or aromatic, linear or branched hydrocarbyl radical having at least 2 carbon atoms, preferably 2 to 10 carbon atoms, preferably at least 3. Examples of $R^{3'}$ radicals comprise n-propyl, n-butyl, n-pentyl, n-hexyl, 2-ethylhexyl, n-heptyl, n-octyl, n-nonyl, n-decyl or phenyl. Examples of suitable $R^{3'}$ radicals comprise n-propyl, n-butyl, n-pentyl, n-hexyl, n-heptyl, n-octyl, n-nonyl, n-decyl, n-dodecyl, n-tetradecyl and phenyl.

The —($-CH_2-CH(R^3)-O-$)$_l$— block is thus a block consisting of alkyleneoxy units having at least 4 carbon atoms, preferably at least 5 carbon atoms, and/or glycidyl ethers having an ether group of at least 2, preferably at least 3 carbon atoms. The units of the second terminal block are more preferably alkyleneoxy units comprising at least 4 and/or 5 carbon atoms, such as butyleneoxy units and/or pentyleneoxy units or units of higher alkylene oxides.

The number of alkyleneoxy units l is a number from 5 to 25, preferably 6 to 20, more preferably 8 to 18, most preferably 8.5 to 17.25. It will be apparent to the person skilled in the art in the field of polyalkylene oxides that the numbers mentioned are mean values of distributions.

In a further embodiment the invention relates to the above described process wherein the number of alkyleneoxy units l is a number from 5 to 30, preferably from 5 to 28, preferably from 5 to 25, preferably from 7 to 23, more preferably from 7 to 18, especially preferably from 8.5 to 17.25. It will be apparent to the person skilled in the art in the field of polyalkylene oxides that the numbers mentioned are mean values of distributions.

Particular preference is given to a macromonomer M of the formula (I) and to a process for preparation thereof, where k is a number from 23 to 26 and l is a number from 5 to 30, preferably from 5 to 28, preferably from 5 to 25, preferably from 7 to 23, more preferably from 7 to 18, especially preferably from 8.5 to 17.25, with the proviso that the sum total of the carbon atoms in all hydrocarbyl radicals $R^3$ or $R^{3'}$ is in the range from 15 to 60, preferably from 15 to 56, particularly from 15 to 50, preferably from 25.5 to 34.5.

Particular preference is given to a macromonomer M of the formula (I) and to a process for preparation thereof, where k is a number from 23 to 26 and l is a number from 8.5 to 17.25, with the proviso that the sum total of the carbon atoms in all hydrocarbyl radicals $R^3$ or $R^{3'}$ is in the range from 25.5 to 34.5.

The optional —($-CH_2-CH_2-O-$)$_m$ block is a polyethyleneoxy radical. The number of alkyleneoxy units m is a number from 0 to 15, preferably from 0 to 10, more preferably from 0.1 to 15, more preferably from 0.1 to 10, especially preferably from 0.5 to 5, further preferably from 0.5 to 2.5.

In a preferred embodiment of the invention, m=0 (i.e. the optional step c) is not executed). It will be apparent to the person skilled in the art in the field of polyalkylene oxides that the numbers mentioned are mean values of distributions.

In a preferred embodiment of the invention, m is greater than 0 (i.e. the optional step c) is executed). In particular, in this embodiment m is a number from 0.1 to 15, preferably from 0.1 to 10, more preferably from 0.5 to 10, especially preferably from 1 to 7, further preferably from 2 to 5. It will be apparent to the person skilled in the art in the field of polyalkylene oxides that the numbers mentioned are mean values of distributions.

More particularly, the present application relates to a process for preparing a macromonomer M of the general formula (I)

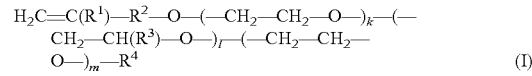

$$H_2C=C(R^1)-R^2-O-(-CH_2-CH_2-O-)_k-(-CH_2-CH(R^3)-O-)_l-(-CH_2-CH_2-O-)_m-R^4 \quad (I)$$

as described above, where the macromonomer M is a mixture of a macromonomer M of the formula (I) where m=0 and a macromonomer M of the formula (I) where m=1 to 15, preferably 1 to 10.

The weight ratio of the macromonomer M of the formula (I) where m=0 and of the macromonomer M of the formula (I) where m=1 to 15 is preferably in the range from 19:1 to 1:19, preferably in the range from 9:1 to 1:9.

These mixtures of macromonomer M of the formula (I) where m=0 and macromonomer M of the formula (I) where m=1 to 15 preferably give rise to a mean value (averaged over all macromonomers in the mixture) in the range of m=0.1 to 15, preferably 0.1 to 10, more preferably 0.5 to 5, more preferably 0.5 to 3, more preferably from 0.5 to 2.5.

In general, an ethoxylation of the alkoxylated alcohol A3 in step c) will be effected preferentially on already ethoxylated chains, since the primary alkoxide group is more active compared to the secondary alkoxide group of the alcohol A3. Thus, more particularly, after step c), there may be a mixture of chains having a terminal ethyleneoxy block —($-CH_2-CH_2-O-$)$_m$ comprising at least one unit (macromonomers of the formula (I)), and chains which do not have a terminal ethyleneoxy block —($-CH_2-CH_2-O-$)$_m$ (macromonomers of the formula (III)).

The $R^4$ radical is H or a preferably aliphatic hydrocarbyl radical having 1 to 30 carbon atoms, preferably 1 to 10 and more preferably 1 to 5 carbon atoms. $R^4$ is preferably H, methyl or ethyl, more preferably H or methyl and most preferably H.

It will be apparent to the person skilled in the art in the field of polyalkyleneoxy block copolymers that the transition between the blocks, according to the method of preparation, may be abrupt or else continuous. In the case of a continuous transition, there is a transition zone comprising monomers of both blocks between the blocks. If the block boundary is fixed at the middle of the transition zone, the first block —($-CH_2-CH_2-O-$)$_k$ may correspondingly have small amounts of units —$CH_2-CH(R^3)-O$— and the second block —($-CH_2-CH(R^3)-O-$)$_l$— small amounts of units —$CH_2-CH_2-O$—, though these units are not distributed randomly over the block, but arranged within the transition zone mentioned. More particularly, the optional third block (—$CH_2-CH_2-O$)$_m$ may have small amounts of units —($-CH_2-CH(R^3)-O-$)—.

The present invention relates to a process for preparing a macromonomer M of the formula (I) where the (—$CH_2-CH_2-O-$)$_k$ and (—$CH_2-CH(R^3)-O-$)$_l$ and optionally —($-CH_2-CH_2-O-$)$_m$ units are arranged in block structure in the sequence shown in formula (I). "Block structure" in the context of the present invention means that the blocks are formed from the corresponding units to an extent of at least 85 mol %, preferably to an extent of at least 90 mol %, more preferably to an extent of at least 95 mol %, based on the total amount of the respective blocks. This means that the blocks, as well as the corresponding units, may have small amounts of other units (especially other polyalkyleneoxy units). More particularly, the optional polyethyleneoxy block —($-CH_2-CH_2-O-$)$_m$ comprises at least 85 mol %, preferably at least 90 mol %, based on the total amount of the polyethyleneoxy block —($-CH_2-CH_2-O-$)$_m$, of the unit (—$CH_2-CH_2-O$—). More particularly, the optional polyethyleneoxy block —($-CH_2-CH_2-$ O—)$_m$ consists of 85 to 95 mol % of the unit (—CH$_2$—CH$_2$—O—) and of 5 to 15 mol % of the unit (—CH$_2$—CH(R$^3$)—O—).

The radicals and indices are preferably each defined as follows:
R$^2$: is independently a divalent linking group —O—(C$_n$H$_{2n'}$)— where n' is a natural number from 2 to 6;
R$^3$: is independently a hydrocarbyl radical having 2 to 4 carbon atoms;
R$^4$: is H.

The radicals and indices are especially preferably each defined as follows:
k: is a number from 20 to 28;
l: is a number from 5 to 30, preferably from 5 to 28, preferably from 5 to 25;
m: is a number from 0 to 15, preferably 0 or preferably from 0.5 to 10;
R$^1$: is H;
R$^2$: is independently a divalent linking group —O—(C$_n$H$_{2n'}$)— where n' is a natural number from 3 to 5.
R$^3$: is independently a hydrocarbyl radical having 2 to 4 carbon atoms, with the proviso that the sum total of the carbon atoms in all hydrocarbyl radicals R$^3$ or R$^{3'}$ is in the range from 15 to 60, preferably from 5 to 56, preferably from 15 to 50;
R$^4$: is H.

The radicals and indices are especially preferably each defined as follows:
k: is a number from 23 to 26;
l: is a number from 5 to 30, preferably from 5 to 28, preferably from 5 to 25;
m: is a number from 0 to 15, preferably 0 or preferably from 0.5 to 10;
R$^1$: is H;
R$^2$: is independently a divalent linking group —O—(C$_n$H$_{2n'}$)— where n' is a natural number from 3 to 5,
R$^3$: is independently a hydrocarbyl radical having 2 to 4 carbon atoms, with the proviso that the sum total of the carbon atoms in all hydrocarbyl radicals R$^3$ or R$^{3'}$ is in the range from 15 to 60, preferably from 15 to 56, preferably from 15 to 50;
R$^4$: is H.

The radicals and indices are especially preferably each defined as follows:
k: is a number from 23 to 26;
l: is a number from 5 to 30, preferably from 5 to 28, preferably from 5 to 25;
m: is a number from 0.1 to 10, preferably from 0.5 to 10, more preferably from 2 to 5;
R$^1$: is H;
R$^2$: is independently a divalent linking group —O—(C$_n$H$_{2n'}$)— where n' is a natural number from 3 to 5,
R$^3$: is independently a hydrocarbyl radical having 2 to 4 carbon atoms, with the proviso that the sum total of the carbon atoms in all hydrocarbyl radicals R$^3$ or R$^{3'}$ is in the range from 15 to 60, preferably from 15 to 56, preferably from 15 to 50;
R$^4$: is H.

The radicals and indices are especially preferably each defined as follows:
k: is a number from 23 to 26;
l: is a number from 8.5 to 17.25;
m: is a number from 0 to 15, preferably 0 or preferably from 0.5 to 10;
R$^1$: is H;
R$^2$: is independently a divalent linking group —O—(C$_n$H$_{2n'}$)— where n' is a natural number from 3 to 5,
R$^3$: is independently a hydrocarbyl radical having 2 to 4 carbon atoms, with the proviso that the sum total of the carbon atoms in all hydrocarbyl radicals R$^3$ or R$^{3'}$ is in the range from 25.5 to 34.5;
R$^4$: is H.

In a preferred embodiment, the present invention relates to an above-described process for preparing a macromonomer M of the formula (I), wherein the radicals and indices are each defined as follows:
k: is a number from 20 to 28;
l: is a number from 7.5 to 30, preferably from 7.5 to 28, preferably from 7.5 to 25, more preferably from 12.75 to 25, especially preferably from 13 to 23, for example 14, 16 or 22;
m: is a number from 0 to 15; preferably 0 or preferably from 0.5 to 10;
R$^1$: is H;
R$^2$: is independently a divalent linking group —O—(C$_n$H$_{2n'}$)— where n' is a natural number from 3 to 5,
R$^3$: is ethyl;
R$^4$: is H.

In a preferred embodiment, the present invention relates to an above-described process for preparing a macromonomer M of the formula (I), wherein the radicals and indices are each defined as follows:
k: is a number from 23 to 26;
l: is a number from 7.5 to 30, preferably from 7.5 to 28, preferably from 7.5 to 25, more preferably from 12.75 to 25, especially preferably from 13 to 23, for example 14, 16 or 22;
m: is a number from 0 to 15; preferably 0 or preferably from 0.5 to 10;
R$^1$: is H;
R$^2$: is independently a divalent linking group —O—(C$_n$H$_{2n'}$)— where n' is a natural number from 3 to 5.
R$^3$: is ethyl;
R$^4$: is H.

In a preferred embodiment, the present invention relates to an above-described process for preparing a macromonomer M of the formula (I), wherein the radicals and indices are each defined as follows:
k: is a number from 23 to 26;
l: is a number from 7.5 to 30, preferably from 7.5 to 28, preferably from 7.5 to 25, more preferably from 12.75 to 25, especially preferably from 13 to 23, for example 14, 16 or 22;
m: is a number from 0.1 to 10, preferably from 0.5 to 10, more preferably from 2 to 5;
R$^1$: is H;
R$^2$: is independently a divalent linking group —O—(C$_n$H$_{2n'}$)— where n' is a natural number from 3 to 5,
R$^3$: is ethyl;
R$^4$: is H.

In a preferred embodiment, the present invention relates to an above-described process for preparing a macromonomer M of the formula (I), wherein the radicals and indices are each defined as follows:
k: is a number from 23 to 26;
l: is a number from 12.75 to 17.25, especially from 13 to 17, for example 14 or 16;
m: is a number from 0 to 15; preferably 0 or preferably from 0.5 to 10;
R$^1$: is H;
R$^2$: is independently a divalent linking group —O—(C$_n$H$_{2n'}$)— where n' is a natural number from 3 to 5.
R$^3$: is ethyl;
R$^4$: is H.

In a further preferred embodiment, the present invention relates to an above-described process for preparing a macromonomer M of the formula (I), wherein the radicals and indices are each defined as follows:

k: is a number from 23 to 26;
l: is a number from 8.5 to 11.5, preferably from 9 to 11, for example 10 or 11;
m: is a number from 0 to 15, preferably from 0 to 10; preferably 0 or preferably from 0.5 to 10;
$R^1$: is H;
$R^2$: is independently a divalent linking group —O—$(C_nH_{2n'})$— where n' is a natural number from 3 to 5,
$R^3$: is n-propyl;
$R^4$: is H.

The present invention additionally relates to the hydrophobically associating macromonomers prepared by the process according to the invention and to the hydrophobically associating copolymers prepared from the macromonomers.

Hydrophobically associating macromonomers or copolymers in the context of the invention are water-soluble macromonomers or copolymers having lateral or terminal hydrophobic groups. In aqueous solution, the hydrophobic groups can associate with themselves or with other substances having hydrophobic groups, and thicken the aqueous medium as a result of this interaction.

The person skilled in the art is aware that the solubility of hydrophobically associating macromonomers or copolymers in water may be more or less dependent on the pH, depending on the nature of the monomers used. The reference point for the assessment of water solubility will therefore in each case be the pH desired for the respective end use of the copolymer. A copolymer having insufficient solubility for the envisaged end use at a particular pH may have a sufficient solubility at another pH. The term "water-soluble" comprises, more particularly, also alkali-soluble dispersions of polymers, i.e. polymers which are present as dispersions in the acidic pH range and dissolve in water and display their thickening action only in the alkaline pH range.

Ideally, the inventive copolymers should be miscible with water in any ratio. According to the invention, however, it is sufficient when the copolymers are water-soluble at least at the desired use concentration and at the desired pH. In general, the solubility in water at room temperature should be at least 20 g/l, preferably at least 50 g/l and more preferably at least 100 g/l.

The present invention relates to a macromonomer M of the general formula (I)

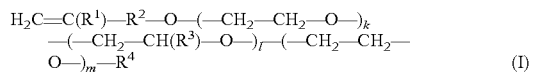

(I)

where the $(-CH_2-CH_2-O-)_k$ and $(-CH_2-CH(R^3)-O-)_l$ and optionally $(-CH_2-CH_2-O-)_m$ units are arranged in block structure in the sequence shown in formula (I);

where the radicals and indices are each defined as follows:
k: is a number from 10 to 150, preferably from to 10 to 50, more preferably from 15 to 35, most preferably from 23 to 26;
l: is a number from 5 to 25, preferably from 7 to 18, especially preferably from 8.5 to 17.25;
m: is a number from 0 to 15, preferably 0 to 10, especially preferably from 0.1 to 10, more preferably from 0.5 to 5, especially preferably 0.5 to 2.5;
$R^1$: is H or methyl;
$R^2$: is independently a single bond or a divalent linking group selected from the group consisting of —$(C_nH_{2n})$— and —O—$(C_nH_{2n'})$—, where n is a natural number from 1 to 6 and n' is a natural number from 2 to 6;
$R^3$: is independently a hydrocarbyl radical having at least 2 carbon atoms, preferably having 2 to 10, especially preferably having 2 to 4 carbon atoms, or an ether group of the general formula —$CH_2$—O—$R^{3'}$ where $R^{3'}$ is a hydrocarbyl radical having at least 2 carbon atoms;
$R^4$: is independently H or a hydrocarbyl radical having 1 to 4 carbon atoms;
obtainable by an above-described process according to the invention.

In a further embodiment the invention relates to the above described macromonomer M of the general formula (I) obtainable by an above-described inventive process, with
l: is a number from 5 to 30, preferably from 5 to 28, preferably from 5 to 25, preferably from 7 to 23, more preferably from 7 to 18, especially preferably from 8.5 to 17.25.

In a further embodiment the invention relates to the above described macromonomer M of the general formula (I) obtainable by an above-described inventive process, wherein k is a number from 10 to 150, preferably from 10 to 50, more preferably from 15 to 35, especially preferably from 20 to 28, most preferably from 23 to 26.

In a further embodiment the invention relates to the above described macromonomer M of the general formula (I) obtainable by an above-described inventive process, with
m: is a number from 0 to 15, preferably from 0 to 10, especially preferably from 0.1 to 10, preferably from 0.5 to 5, more preferably from 0.5 to 3.5, especially preferably from 0.5 to 2.5.

It has additionally been found that especially macromonomers having a specific ratio of ethylene oxide (EO) and pentylene oxide (PeO) and/or butylene oxide (BuO) blocks can be prepared particularly advantageously by means of the process according to the invention.

The present invention relates especially to an abovementioned macromonomer M obtainable by the process according to the invention, where the radicals and indices of the formula (I) are each defined as follows:
k: is a number from 20 to 28;
l: is a number from 5 to 30, preferably from 5 to 28, preferably from 5 to 25;
m: is a number from 0 to 15, preferably 0 or preferably from 0.5 to 10;
$R^1$: is H or methyl;
$R^2$: is independently a single bond or a divalent linking group selected from the group consisting of —$(C_nH_{2n})$— and —O—$(C_nH_{2n'})$—, where n is a natural number from 1 to 6 and n' is a natural number from 2 to 6;
$R^3$: is independently a hydrocarbyl radical having at least 2 carbon atoms, preferably having 2 to 4 carbon atoms, with the proviso that the sum total of the carbon atoms in all hydrocarbyl radicals $R^3$ is in the range from 15 to 60, preferably from 15 to 56, preferably from 15 to 50;
$R^4$: is independently H or a hydrocarbyl radical having 1 to 4 carbon atoms.

The present invention relates especially to an abovementioned macromonomer M obtainable by the process according to the invention, where the radicals and indices of the formula (I) are each defined as follows:

k: is a number from 23 to 26;
l: is a number from 5 to 30, preferably from 5 to 28, preferably from 5 to 25;
m: is a number from 0 to 15, preferably 0 or preferably from 0.5 to 10;
$R^1$: is H or methyl;
$R^2$: is independently a single bond or a divalent linking group selected from the group consisting of —($C_nH_{2n}$)— and —O—($C_nH_{2n'}$)—, where n is a natural number from 1 to 6 and n' is a natural number from 2 to 6;
$R^3$: is independently a hydrocarbyl radical having at least 2 carbon atoms, preferably having 2 to 4 carbon atoms, with the proviso that the sum total of the carbon atoms in all hydrocarbyl radicals $R^3$ is in the range from 15 to 60, preferably from 15 to 56, preferably from 15 to 50;
$R^4$: is independently H or a hydrocarbyl radical having 1 to 4 carbon atoms.

The present invention relates especially to an abovementioned macromonomer M obtainable by the process according to the invention, where the radicals and indices of the formula (I) are each defined as follows:
k: is a number from 23 to 26;
l: is a number from 8.5 to 17.25;
m: is a number from 0 to 15, preferably 0 or preferably 0.5 to 10;
$R^1$: is H or methyl;
$R^2$: is independently a single bond or a divalent linking group selected from the group consisting of —($C_nH_{2n}$)— and —O—($C_nH_{2n'}$)—, where n is a natural number from 1 to 6 and n' is a natural number from 2 to 6;
$R^3$: is independently a hydrocarbyl radical having at least 2 carbon atoms, preferably having 2 to 4 carbon atoms, with the proviso that the sum total of the carbon atoms in all hydrocarbyl radicals $R^3$ is in the range from 25.5 to 34.5;
$R^4$: is independently H or a hydrocarbyl radical having 1 to 4 carbon atoms.

The present invention relates especially to an abovementioned macromonomer M obtainable by the process according to the invention, where the radicals and indices of the formula (I) are each defined as follows:
k: is a number from 20 to 28;
l: is a number from 5 to 30, preferably from 5 to 28, preferably from 5 to 25;
m: is a number from 0 to 15, preferably 0 or preferably from 0.5 to 10;
$R^1$: is H;
$R^2$: is independently a divalent linking group —O—($C_nH_{2n'}$)— where n' is a natural number from 3 to 5,
$R^3$: is independently a hydrocarbyl radical having 2 to 4 carbon atoms, with the proviso that the sum total of the carbon atoms in all hydrocarbyl radicals $R^3$ is in the range from 15 to 60, preferably from 15 to 56, preferably from 15 to 50;
$R^4$: is H.

The present invention relates especially to an abovementioned macromonomer M obtainable by the process according to the invention, where the radicals and indices of the formula (I) are each defined as follows:
k: is a number from 23 to 26;
l: is a number from 5 to 30, preferably from 5 to 28, preferably from 5 to 25;
m: is a number from 0 to 15, preferably 0 or preferably from 0.5 to 10;
$R^1$: is H;
$R^2$: is independently a divalent linking group —O—($C_nH_{2n'}$)— where n' is a natural number from 3 to 5,
$R^3$: is independently a hydrocarbyl radical having 2 to 4 carbon atoms, with the proviso that the sum total of the carbon atoms in all hydrocarbyl radicals $R^3$ is in the range from 15 to 60, preferably from 15 to 56, preferably from 15 to 50;
$R^4$: is H.

The present invention relates especially to an abovementioned macromonomer M obtainable by the process according to the invention, where the radicals and indices of the formula (I) are each defined as follows:
k: is a number from 23 to 26;
l: is a number from 8.5 to 17.25;
m: is a number from 0 to 15, preferably 0 or preferably 0.5 to 10;
$R^1$: is H;
$R^2$: is independently a divalent linking group —O—($C_nH_{2n'}$)— where n' is a natural number from 3 to 5,
$R^3$: is independently a hydrocarbyl radical having 2 to 4 carbon atoms, with the proviso that the sum total of the carbon atoms in all hydrocarbyl radicals $R^3$ is in the range from 25.5 to 34.5;
$R^4$: is H.

In addition, the preferred embodiments and definitions for the macromonomer M obtainable by the process according to the invention described above in connection with the process according to the invention apply.

In a further aspect, the present invention relates to a macromonomer M of the general formula (I)

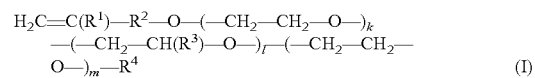

where the (—$CH_2$—$CH_2$—O—)$_k$ and (—$CH_2$—CH($R^3$)—O—)$_l$ and optionally —(—$CH_2$—$CH_2$—O—)$_m$ units are arranged in block structure in the sequence shown in formula (I);
and the radicals and indices are each defined as follows:
k: is a number from 10 to 150, preferably from 10 to 50, more preferably from 15 to 35, especially preferably from 20 to 28, most preferably from 23 to 26;
l: is a number from 5 to 30, preferably from 5 to 28, preferably from 5 to 25, preferably from 7 to 23, especially preferably from 8.5 to 17.25;
m: is a number from 0 to 15, preferably from 0 to 10, especially preferably from 0.1 to 15, preferably from 0.1 to 10, more preferably from 0.5 to 10, especially preferably from 1 to 7, further preferably from 2 to 5;
$R^1$: is H or methyl;
$R^2$: is independently a single bond or a divalent linking group selected from the group consisting of —($C_nH_{2n}$)— and —O—($C_nH_{2n'}$)—, where n is a natural number from 1 to 6 and n' is a natural number from 2 to 6;
$R^3$: is independently a hydrocarbyl radical having at least 2 carbon atoms, preferably having 2 to 10, especially preferably having 2 to 4, carbon atoms, more preferably ethyl and/or n-propyl, or an ether group of the general formula —$CH_2$—O—$R^{3'}$ where $R^{3'}$ is a hydrocarbyl radical having at least 2 carbon atoms;
$R^4$: is independently H or a hydrocarbyl radical having 1 to 4 carbon atoms.

Preferably the invention relates to a macromomer M as defined above with m is greater than 0. In particular the invention relates to a macromonomer M as defined above wherein the radicals and indices of formula (I) are each defined as follows:
m; is a number from 0.1 to 15, preferably from 0.1 to 10, more preferably from 0.5 to 10, especially preferably from 1 to 7, further preferably from 2 to 5.

In a further aspect, the present invention preferably relates to a macromonomer M of the general formula (I)

$$H_2C=C(R^1)-R^2-O-(-CH_2-CH_2-O-)_k-(-CH_2-CH(R^3)-O-)_l-(-CH_2-CH_2-O-)_m-R^4 \quad (I)$$

where the $(-CH_2-CH_2-O-)_k$ and $(-CH_2-CH(R^3)-O-)_l$ and optionally $-(-CH_2-CH_2-O-)_m$ units are arranged in block structure in the sequence shown in formula (I);
and the radicals and indices are each defined as follows:
k: is a number from 20 to 28;
l: is a number from 5 to 30, preferably from 5 to 28, preferably from 5 to 25, preferably from 7 to 23;
m: is a number from 0 to 15, preferably from 0 to 10, especially preferably from 0.1 to 15, preferably from 0.1 to 10, more preferably from 0.5 to 10, especially preferably from 1 to 7, further preferably from 2 to 5.
$R^1$: is H;
$R^2$: is independently a divalent linking group —O— $(C_{n'}H_{2n'})$— where n' is a natural number from 3 to 5,
$R^3$: is independently a hydrocarbyl radical having 2 or 3 carbon atoms;
$R^4$: is H.

In a further aspect, the present invention preferably relates to a macromonomer M of the general formula (I)

$$H_2C=C(R^1)-R^2-O-(-CH_2-CH_2-O-)_k-(-CH_2-CH(R^3)-O-)_l-(-CH_2-CH_2-O-)_m-R^4 \quad (I)$$

where the $(-CH_2-CH_2-O-)_k$ and $(-CH_2-CH(R^3)-O-)_l$ and optionally $-(-CH_2-CH_2-O-)_m$ units are arranged in block structure in the sequence shown in formula (I);
and the radicals and indices are each defined as follows:
k: is a number from 23 to 26;
l: is a number from 5 to 30, preferably from 5 to 28, preferably from 5 to 25, preferably from 7 to 23;
m: is a number from 0 to 15, preferably from 0 to 10, especially preferably from 0.1 to 15, preferably from 0.1 to 10, more preferably from 0.5 to 10, especially preferably from 1 to 7, further preferably from 2 to 5.
$R^1$: is H;
$R^2$: is independently a divalent linking group —O— $(C_{n'}H_{2n'})$— where n' is a natural number from 3 to 5,
$R^3$: is independently a hydrocarbyl radical having 2 or 3 carbon atoms;
$R^4$: is H.

In a further aspect, the present invention preferably relates to a macromonomer M of the general formula (I)

$$H_2C=C(R^1)-R^2-O-(-CH_2-CH_2-O-)_k-(-CH_2-CH(R^3)-O-)_l-(-CH_2-CH_2-O-)_m-R^4 \quad (I)$$

where the $(-CH_2-CH_2-O-)_k$ and $(-CH_2-CH(R^3)-O-)_l$ and optionally $-(-CH_2-CH_2-O-)_m$ units are arranged in block structure in the sequence shown in formula (I);
and the radicals and indices are each defined as follows:
k: is a number from 23 to 26;
l: is a number from 8.5 to 17.25;
m: is a number from 0 to 15, preferably 0 to 10, especially preferably from 0.1 to 10, more preferably from 0.5 to 5, especially preferably 0.5 to 2.5;
$R^1$: is H;
$R^2$: is independently a divalent linking group —O— $(C_{n'}H_{2n'})$— where n' is a natural number from 3 to 5,
$R^3$: is independently a hydrocarbyl radical having 2 or 3 carbon atoms;
$R^4$: is H.

In addition, the preferred embodiments and definitions for the macromonomer M described above in connection with the process according to the invention apply.

The inventive macromonomers M can be reacted with further monoethylenically unsaturated, hydrophilic monomers (b) to give copolymers. These water-soluble, hydrophobically associating copolymers typically comprise the following monomers:
(a) 0.1 to 20% by weight, preferably 0.5 to 12% by weight, of at least one inventive macromonomer M, and
(b) 25% by weight to 99.9% by weight of at least one different, monoethylenically unsaturated, hydrophilic monomer (b),
where the stated amounts are each based on the total amount of all monomers in the copolymer, The hydrophilic monomers (b) comprise, as well as an ethylenic group, one or more hydrophilic groups. These impart sufficient water solubility to the inventive copolymer owing to their hydrophilicity. The hydrophilic groups are especially functional groups comprising oxygen and/or nitrogen atoms. They may additionally comprise especially sulfur and/or phosphorus atoms as heteroatoms.

The monomers (b) are more preferably miscible with water in any ratio, but it is sufficient for execution of the invention that the inventive hydrophobically associating copolymer has the water solubility mentioned at the outset. In general, the solubility of the monomers (b) in water at room temperature should be at least 100 g/l, preferably at least 200 g/l and more preferably at least 500 g/l.

The hydrophilic monomers (b) preferably have functional groups selected from the group consisting of carbonyl groups >C=O, ether groups —O—, especially polyethylene oxide groups —$(CH_2-CH_2-O-)_n$— where n is preferably a number from 1 to 200, hydroxyl groups —OH, primary, secondary or tertiary amino groups, ammonium groups, amide groups —C(O)—NH—, carboxamide groups —C(O)—$NH_2$ or acidic groups such as carboxyl groups —COOH, sulfo groups —$SO_3H$, phosphonic acid groups —$PO_3H_2$ or phosphoric acid groups —$OP(OH)_3$. Examples of preferred functional groups comprise hydroxyl groups —OH, carboxyl groups —COOH, sulfo groups —$SO_3H$, carboxamide groups —C(O)—$NH_2$, amide groups —C(O)—NH— and polyethylene oxide groups —$(CH_2-CH_2-O-)_n$—H where n is preferably a number from 1 to 200.

The functional groups may be attached directly to the ethylenic group, or else joined to the ethylenic group via one or more linking hydrocarbyl groups.

The hydrophilic monomers (b) are preferably monomers of the general formula (IV)

$$H_2C=C(R^5)R^6 \quad (IV)$$

where $R^5$ is H or methyl and $R^6$ is one or more of the abovementioned hydrophilic group(s).

The at least one monomer (b) may preferably be selected from the group consisting of acrylic acid, methacrylic acid, crotonic acid, itaconic acid, maleic acid, fumaric acid, vinylsulfonic acid, allylsulfonic acid, 2-acrylamido-2-methylpropanesulfonic acid (AMPS), 2-methacrylamido-2-methylpropanesulfonic acid, 2-acrylamidobutanesulfonic acid, 3-acrylamido-3-methylbutanesulfonic acid, 2-acrylamido-2,4,4-trimethylpentanesulfonic acid, vinylphosphonic acid, allylphosphonic acid. N-(meth)acrylamidoalkylphosphonic acids and (meth)acryloyloxyalkylphosphonic acids.

At least one of the monomers (b) is preferably a monomer selected from the group of (meth)acrylic acid, vinylsulfonic acid, allylsulfonic acid or 2-acrylamido-2-methylpropanesulfonic acid (AMPS), more preferably acrylic acid and/or APMS or the salts thereof.

At least one of the monomers (b) is preferably a monomer selected from the group of (meth)acrylic acid, vinylsulfonic acid, allylsulfonic acid or 2-acrylamido-2-methylpropanesulfonic acid (AMPS), more preferably acrylic acid and/or AMPS or the salts thereof.

The invention preferably relates to a copolymer comprising at least two different hydrophilic monomers (b), which are at least one uncharged hydrophilic monomer (b1) and at least one hydrophilic anionic monomer (b2) comprising at least one acidic group selected from the group of —COOH, —$SO_3H$ and —$PO_3H_2$ (or salts thereof).

The copolymer is preferably one comprising acrylamide as monomer (b1) and a monomer comprising acidic groups as monomer (b2).

The copolymer is preferably one comprising acrylamide as monomer (b1) and a monomer comprising acidic groups as monomer (b2), the acidic group being —$SO_3H$. The copolymer is especially preferably one comprising acrylamide as monomer (b1) and 2-acrylamido-2-methylpropanesulfonic acid (AMPS) as monomer (b2).

The copolymer is additionally preferably one comprising acrylamide as monomer (b1) and at least two further different monomers (b2) comprising acidic groups. The copolymer is especially preferably one comprising acrylamide as monomer (b1) and a monomer comprising the —$SO_3H$ group and a monomer comprising the —COOH group as monomers (b2) comprising acidic groups.

In a preferred embodiment the copolymer is preferably one comprising acrylamide as monomer (b1) and a acrylic acid as monomer (b2).

The copolymer is additionally preferably one comprising acrylamide as monomer (b1), and 2-acrylamido-2-methylpropanesulfonic acid (AMPS) and a monomer comprising the —COOH group as monomers (b2). The copolymer is additionally preferably one comprising acrylamide as monomer (b1), and 2-acrylamido-2-methylpropanesulfonic acid (AMPS) and acrylic acid as monomers (b2).

The amount of the monomers (b) in the inventive copolymer is 25 to 99.9% by weight based on the total amount of all monomers in the copolymer, preferably 25 to 99.5% by weight. The exact amount is guided by the nature and the desired and use of the hydrophobically associating copolymers and is fixed accordingly by the person skilled in the art.

Further suitable monoethylenically unsaturated, hydrophilic monomers (b) are described in WO 2010/133527 on pages 13 to 16.

Preference is given to a copolymer comprising the following monomers:
(a) 0.1 to 20% by weight, preferably 0.5 to 12% by weight, of at least one inventive macromonomer M, and
(b) 40 to 60% by weight of acrylamide and 40 to 60% by weight of acrylamido-2-methylpropanesulfonic acid (AMPS) as monoethylenically unsaturated, hydrophilic monomer (b).

In addition, the use of such copolymers for development, exploitation and completion of underground mineral oil and natural gas deposits has been found, as have the compositions of the copolymers preferred for the respective use. The inventive hydrophobically associating copolymers therefore comprise, as well as the hydrophobic groups already mentioned, hydrophilic groups in such an amount that the water solubility described is ensured at least within the pH range envisaged for the respective application.

The following examples are intended to illustrate the invention in detail:

PART I: SYNTHESES

I-a Preparation of the Macromonomers

Unless mentioned explicitly, the reactions were conducted in such a way that the target fill level at the end of the alkoxylation was approx. 65% of the reactor volume.

Example M1

HBVE-22 EO (0.4 mol % of Potassium Ions)

A 2 l pressure autoclave with anchor stirrer was initially charged with 135.3 g (1.16 mol) of hydroxybutyl vinyl ether (HBVE) (stabilized with 100 ppm of potassium hydroxide (KOH)) and the stirrer was switched on. 1.06 g of potassium methoxide (KOMe) solution (32% KOMe in methanol (MeOH), corresponding to 0.0048 mol of potassium) were fed in and the stirred vessel was evacuated to a pressure less than 10 mbar, heated to 80° C. and operated at 80° C. and a pressure of less than 10 mbar for 70 min. MeOH was distilled off.

According to an alternative procedure the potassium methoxide (KOMe) solution (32% KOMe in methanol (MeOH)) were fed in and the stirred vessel was evacuated to a pressure of 10-20 mbar, heated to 65° C. and operated at 65° C. and a pressure of 10-20 mbar for 70 min. MeOH was distilled off.

The mixture was purged three times with $N_2$ (nitrogen). Thereafter, the vessel was checked for pressure retention, 0.5 bar gauge (1.5 bar absolute) was set and the mixture was heated to 120° C. The mixture was decompressed to 1 bar absolute and 1126 g (25.6 mol) of ethylene oxide (EO) were metered in until $p_{max}$ was 3.9 bar absolute and $T_{max}$ was 150° C. After 300 g of EO had been metered in, the metered addition was stopped (about 3 h after commencement) for a wait period of 30 min and the mixture was decompressed to 1.3 bar absolute. Thereafter, the rest of the EO was metered in. The metered addition of EO including the decompression took a total of 10 h.

Stirring was continued to constant pressure at approx. 145-150° C. (1 h), and the mixture was cooled to 100° C. and freed of low boilers at a pressure of less than 10 mbar for 1 h. The material was transferred at 80° C. under $N_2$.

The analysis (OH number, GPC, 1H NMR in $CDCl_3$, 1H NMR in MeOD) confirmed the structure.

Example M2

HBVE-22 EO-10.6 PeO (0.4 mol % of Potassium Ions, 4.6 mol % of Sodium Ions), Addition of the PeO at 140° C. to 3.2 bar A 2 l pressure autoclave with anchor stirrer was initially charged with 135.3 g (1.16 mol) of hydroxybutyl vinyl ether (stabilized with 100 ppm of KOH) and the stirrer was switched on. 1.06 g of KOMe solution (32% KOMe in MeOH, corresponding to 0.0048 mol of K) were fed in and the stirred vessel was evacuated to <10 mbar, heated to 80° C. and operated at 80° C. and <10 mbar for 70 min. MeOH was distilled off.

According to an alternative procedure the potassium methoxide (KOMe) solution (32% KOMe in methanol (MeOH)) were fed in and the stirred vessel was evacuated to a pressure of 10-20 mbar, heated to 65° C. and operated at 65° C. and a pressure of 10-20 mbar for 70 min. MeOH was distilled off.

The mixture was purged three times with $N_2$. Thereafter, the vessel was checked for pressure retention, 0.5 bar gauge (1.5 bar absolute) was set and the mixture was heated to 120° C. The mixture was decompressed to 1 bar absolute and 255 g (5.8 mol) of EO were metered in until $p_{max}$ was 3.9 bar absolute and $T_{max}$ was 150° C. Stirring was continued up to constant pressure at approx. 145-150° C. (1 h), and the mixture was cooled to 100° C. and freed of low boilers at a pressure of less than 10 mbar for 1 h. The material (HBVE-5 EO) was transferred at 80° C. under $N_2$.

A 2 l pressure autoclave with anchor stirrer was initially charged with 180 g (0.54 mol) of the above HBVE-5 EO and the stirrer was switched on. Thereafter, 4.32 g of 30% NaOMe (sodium methoxide) in MeOH solution (0.024 mol of NaOMe, 1.30 g of NaOMe) were added, a reduced pressure of <10 mbar was applied, and the mixture was heated to 100° C. and kept there for 80 min, in order to distill off the MeOH. The mixture was purged three times with $N_2$. Thereafter, the vessel was checked for pressure retention, 0.5 bar gauge (1.5 bar absolute) was set and the mixture was heated to 150° C. The mixture was decompressed to 1.0 bar absolute. 398 g (9.04 mol) of EO were metered in up to a pressure of 2 bar absolute and the mixture was allowed to react further for 1 h. The mixture was cooled to 140° C. and 502 g (5.83 mol) of PeO (pentene oxide) were metered in at 1.2 bar absolute and 140° C. until the pressure rose to 3.2 bar absolute. The PeO was metered in within two hours. The mixture was cooled to 80° C., and residual oxide was drawn off until the pressure was below 10 mbar for at least 10 min. The vacuum was broken with $N_2$ and 100 ppm of BHT (butylhydroxytoluene) were added. The transfer was effected at 80° C. under $N_2$.

The analysis (mass spectrum, GPC, 1H NMR in $CDCl_3$, 1H NMR in MeOD) confirmed the structure.

Example M3

HBVE-22 EO-10.5 PeO (0.4 mol % of Potassium Ions, 3.3 mol % of Sodium Ions), Addition of the PeO at 140° C. to 2.1 bar A 2 l pressure autoclave with anchor stirrer was initially charged with 135.3 g (1.16 mol) of hydroxybutyl vinyl ether (stabilized with 100 ppm of KOH) and the stirrer was switched on. 1.06 g of KOMe solution (32% KOMe in MeOH, corresponding to 0.0048 mol of K) were fed in and the stirred vessel was evacuated to <10 mbar, heated to 80° C. and operated at 80° C. and <10 mbar for 70 min. MeOH was distilled off.

According to an alternative procedure the potassium methoxide (KOMe) solution (32% KOMe in methanol (MeOH)) were fed in and the stirred vessel was evacuated to a pressure of 10-20 mbar, heated to 65° C. and operated at 65° C. and a pressure of 10-20 mbar for 70 min. MeOH was distilled off.

The mixture was purged three times with $N_2$. Thereafter, the vessel was checked for pressure retention, 0.5 bar gauge (1.5 bar absolute) was set and the mixture was heated to 120° C. The mixture was decompressed to 1 bar absolute and 255 g (5.8 mol) of EO were metered in until $p_{max}$ was 3.9 bar absolute and $T_{max}$ was 150° C. Stirring was continued up to constant pressure at approx. 145-150° C. (1 h), and the mixture was cooled to 100° C. and freed of low boilers at a pressure of less than 10 mbar for 1 h. The material (HBVE-5 EO) was transferred at 80° C. under $N_2$.

A 2 l pressure autoclave with anchor stirrer was initially charged with 180 g (0.54 mol) of HBVE-5 EO and the stirrer was switched on. Thereafter, 3.18 g of 30% NaOMe in MeOH solution (0.018 mol of NaOMe, 0.95 g of NaOMe) were added, a reduced pressure of <10 mbar was applied, and the mixture was heated to 100° C. and kept there for 80 min, in order to distill off the MeOH. The mixture was purged three times with $N_2$. Thereafter, the vessel was checked for pressure retention, 0.5 bar gauge (1.5 bar absolute) was set and the mixture was heated to 150° C. The mixture was decompressed to 1.0 bar absolute. 398 g (9.04 mol) of EO were metered in up to a pressure of 2 bar absolute, reaction was allowed to continue for 1 h, then the mixture was cooled to 100° C. and freed of low boilers at a pressure of less than 10 mbar for 1 h. The material (HBVE-22 EO) was transferred at 80° C. under $N_2$.

A 1 l autoclave with anchor stirrer was initially charged with 450 g (0.425 mol) of the above HBVE-22 EO and the stirrer was switched on. The mixture was purged three times with $N_2$. Thereafter, the vessel was checked for pressure retention, 0.5 bar gauge (1.5 bar absolute) was set and the mixture was heated to 140° C. The mixture was decompressed to 1.0 bar absolute.

Then, at 1.4 bar absolute and 140° C., 384 g (5.83 mol) of PeO were metered in at 48 g/h until the pressure rose to 2.1 bar absolute. Two interruptions were necessary. The mixture was left to react at 140° C. until the pressure fell again. The PeO was metered in within two days. The mixture was cooled to 80° C., and residual oxide was drawn off until the pressure was below 10 mbar for at least 10 min. The vacuum was broken with $N_2$ and 100 ppm of BHT were added. The transfer was effected at 80° C. under $N_2$.

The analysis (mass spectrum, GPC, 1H NMR in $CDCl_3$, 1H NMR in MeOD) confirmed the structure.

Example M4

HBVE-22 EO-10 PeO (0.4 mol % of Potassium Ions, 4.6 mol % of Sodium Ions), Addition of the PeO at 127° C. to 2.1 bar The starting material used was macromonomer M1 from example M1. A 2 l pressure autoclave with anchor stirrer was initially charged with 745 g (0.69 mol) of HBVE-22 EO and the stirrer was switched on. Thereafter, 5.36 g of 32% NaOMe in MeOH solution (0.0317 mol of NaOMe, 1.71 g of NaOMe) were added, a reduced pressure of <10 mbar was applied, and the mixture was heated to 80° C. and kept there for 80 min, in order to distill off the MeOH.

The mixture was purged three times with $N_2$. Thereafter, the vessel was tested for pressure retention, 0.5 bar gauge (1.5 bar absolute) was set, the mixture was heated to 127° C. and then the pressure was set to 1 bar absolute.

591 g (6.9 mol) of PeO were metered in at 127° C.; $p_{max}$ was 2.1 bar absolute. Two intermediate decompressions were necessary owing to increasing fill level. The PeO metering was stopped, and the mixture was left to react for 2 h until the pressure was constant and decompressed to 1.0 bar absolute. Thereafter, the metered addition of PeO was continued. $P_{max}$ was still 2.1 bar. After metered addition of PeO had ended, reaction was allowed to continue to constant pressure or for 4 h. The mixture was cooled to 110° C., and residual oxide was drawn off until the pressure was below 10 mbar for at least 10 min. Then 0.5% water was added at 110° C. and volatiles were subsequently drawn off until the pressure was below 10 mbar for at least 10 min. The vacuum was broken with $N_2$ and 100 ppm of BHT were added. The transfer was effected at 80° C. under $N_2$.

The analysis (mass spectrum, GPC, 1H NMR in $CDCl_3$, 1H NMR in MeOD) confirmed the structure.

Example M5

HBVE-22 EO-11 PeO (0.4 mol % of Potassium Ions, 4.6 mol % of Sodium Ions), Addition of the PeO at 127° C. to 2.1 bar The preparation was analogous to example M4, except that 11 rather than 10 eq (molar equivalents) of PeO were added.

Example M6

HBVE-24.5 EO-11 PeO (0.4 mol % of Potassium Ions, 4.6 mol % of Sodium Ions), Addition of the PeO at 127° C. to 2.1 bar The starting material used was macromonomer M1 from example M1. A 2 l pressure autoclave with anchor stirrer was initially charged with 650 g (0.60 mol) of HBVE-22 EO and the stirrer was switched on. Thereafter, 5.96 g of 25% NaOMe in MeOH solution (0.0276 mol of NaOMe, 1.49 g of NaOMe) were added, a reduced pressure of <10 mbar was applied, and the mixture was heated to 100° C. and kept there for 80 min, in order to distill off the MeOH.

The mixture was purged three times with $N_2$. Thereafter, the vessel was tested for pressure retention, 0.5 bar gauge (1.5 bar absolute) was set, the mixture was heated to 120° C. and then the pressure was set to 1 bar absolute. 66 g (1.577 mol) of EO were metered in up to a temperature of 127° C.; $p_{max}$ was 2.1 bar absolute. After waiting for 30 min for establishment of constant pressure, the mixture was decompressed to 1.0 bar absolute.

567 g (6.6 mol) of PeO were metered in at 127° C.; $p_{max}$ was 2.1 bar absolute. Two intermediate decompressions were necessary owing to increasing fill level. The PeO metering was stopped, and the mixture was left to react for 2 h until the pressure was constant and decompressed to 1.0 bar absolute. Thereafter, the metered addition of PeO was continued. $P_{max}$ was still 2.1 bar. After metered addition of PeO had ended, reaction was allowed to continue to constant pressure or for 4 h. The mixture was cooled to 110° C. and residual oxide was drawn off until the pressure was below 10 mbar for at least 10 min. Then 0.5% water was added at 110° C. and volatiles were subsequently drawn off until the pressure was below 10 mbar for at least 10 min. The vacuum was broken with $N_2$ and 100 ppm of BHT were added. The transfer was effected at 80° C. under $N_2$.

The analysis (mass spectrum, GPC, 1H NMR in $CDCl_3$, 1H NMR in MeOD) confirmed the structure.

Example M7

HBVE-24.5 EO-10 PeO (0.4 mol % of Potassium Ions, 4.6 mol % of Sodium Ions), Addition of the PeO at 127° C. to 2.1 bar Preparation was analogous to example M6, except that 10 rather than 11 eq of pentene oxide were added.

Example M8

HBVE-24.5 EO-10 PeO (0.9 mol % of Potassium Ions, 4.1 mol % of Sodium Ions), Addition of the PeO at 127° C. to 2.1 bar The preparation was analogous to example M6, except that the catalyst concentration was 0.9 mol % of potassium ions and 4.1 mol % of sodium ions and 10 rather than 11 eq of PeO were added.

Example M9

HBVE-24.5 EO-10 PeO (1.5 mol % of Potassium Ions, 4.6 mol % of Sodium Ions), Addition of the PeO at 127° C. to 2.1 bar The preparation was analogous to example M6, except that the catalyst concentration was 1.5 mol % of potassium ions and 4.1 mol % of sodium ions and 10 rather than 11 eq of PeO were added.

Example M10

HBVE-24.5 EO-10 PeO (0.4 mol % of Potassium Ions, 5.5 mol % of Sodium Ions), Addition of the PeO at 127° C. to 2.1 bar The starting material used was macromonomer M1 from example M1. A 2 l pressure autoclave with anchor stirrer was initially charged with 684.0 g (0.631 mol) of HBVE-22 EO and the stirrer was switched on. Thereafter, 2.78 g of 50% NaOH (sodium hydroxide) solution (0.0348 mol of NaOH, 1.39 g of NaOH) were added, a reduced pressure of <10 mbar was applied, and the mixture was heated to 100° C. and kept there for 80 min, in order to distill off the water.

The mixture was purged three times with $N_2$. Thereafter, the vessel was tested for pressure retention, 0.5 bar gauge (1.5 bar absolute) was set, the mixture was heated to 120° C. and then the pressure was set to 1.6 bar absolute. 69.4 g (1.577 mol) of EO were metered in at 127° C.; $p_{max}$ was 2.1 bar absolute. After waiting for 30 min for establishment of constant pressure, the mixture was decompressed to 1.0 bar absolute.

542.5 g (6.03 mol) of PeO were metered in at 127° C.; $p_{max}$ was 2.1 bar absolute. One intermediate decompression was necessary owing to increasing fill level. The PeO metering was stopped, and the mixture was left to react for 1 h until the pressure was constant and decompressed to 1.0 bar absolute. Thereafter, the metered addition of PeO was continued. $P_{max}$ was still 2.1 bar (first decompression after 399 g of PeO, total PeO metering time 7 h incl. decompression break). After metered addition of PeO had ended, reaction was allowed to continue to constant pressure or for 3 h. The mixture was cooled to 110° C., and residual oxide was removed under reduced pressure until the pressure was below 10 mbar for at least 10 min. Then 0.5% water was added at 110° C. and volatiles were subsequently drawn off until the pressure was below 10 mbar for at least 10 min. The vacuum was broken with $N_2$ and 100 ppm of BHT were added. The transfer was effected at 80° C. under $N_2$.

The analysis (mass spectrum, GPC, 1H NMR in $CDCl_3$, 1H NMR in MeOD) confirmed the structure.

Example M11

HBVE-24.5 EO-9 PeO (0.4 mol % of Potassium Ions, 5.5 mol % of Sodium Ions), Addition of the PeO at 127° C. to 2.1 bar The preparation was analogous to example M10, except that 9 rather than 10 eq of PeO were added.

Example M12

HBVE-24.5 EO-9 PeO (5.8 mol % of Potassium Ions), Addition of the PeO at 127° C. to 2.1 bar The starting material used was macromonomer M1 from example M1. A 2 l pressure autoclave with anchor stirrer was initially charged with 889.2 g (0.820 mol) of HBVE-22 EO and the stirrer was switched on. Thereafter, 9.69 g of 32% KOMe in MeOH solution (0.0443 mol of KOMe, 3.11 g KOMe) were added, a reduced pressure of <10 mbar was applied, and the mixture was heated to 80° C. and kept there for 80 min, in order to distill off MeOH.

The mixture was purged three times with $N_2$. Thereafter, the vessel was tested for pressure retention, 0.5 bar gauge (1.5 bar absolute) was set, the mixture was heated to 120° C. and then the pressure was set to 1 bar absolute. 90.2 g (2.050 mol) of EO were metered in up to 140° C. After waiting for 30 min for establishment of constant pressure, the mixture was decompressed to 1.0 bar absolute at 120° C.

A relatively large sample was taken, such that 789 g (0.66 mol) of HBVE-24.5 EO remained in the reactor. For safety, the mixture was inertized again with $N_2$, set to 1.0 bar absolute and heated to 127° C. 511 g (5.95 mol) of PeO were metered in at 127° C.; $p_{max}$ was 2.1 bar absolute. One intermediate decompression was necessary owing to increasing fill level. The PeO metering was stopped, and the mixture was left to react for 2 h until pressure was constant and decompressed to 1.0 bar absolute. Thereafter, the metered addition of PeO was continued. $P_{max}$ was still 2.1 bar. After metered addition of PeO had ended, reaction was allowed to continue to constant pressure or for 3 h. The mixture was cooled to 110° C., and residual oxide was removed under reduced pressure until the pressure was below 10 mbar for at least 10 min. Then 0.5% water was added at 110° C. and volatiles were subsequently drawn off until the pressure was below 10 mbar for at least 10 min. The vacuum was broken with $N_2$ and 100 ppm of BHT were added. The transfer was effected at 80° C. under $N_2$.

The analysis (mass spectrum, GPC, 1H NMR in $CDCl_3$, 1H NMR in MeOD) confirmed the structure.

Example M13

HBVE-24.5 EO-8 PeO (0.4 mol % of Potassium Ions, 4.6 mol % of Sodium Ions), Addition of the PeO at 127° C. to 2.1 bar The preparation was analogous to example M6, except that 8 rather than 11 eq of PeO were added.

Example M14

HBVE-26.5 EO-10 PeO (0.4 mol % of Potassium Ions, 5.5 mol % of Sodium Ions), Addition of the PeO at 127° C. to 2.1 bar The preparation was analogous to example M10, except that, proceeding from HBVE-22 EO, 4.5 eq of EO rather than 2.5 eq of EO were added.

Example M15

HBVE-24.5 EO-10 PeO (0.4 mol % of Potassium Ions, 5.5 mol % of Sodium Ions), Addition of the PeO at 122° C. to 2.1 bar The preparation was analogous to example M10, except that PeO was added at 122° C. rather than 127° C.

Example M16

HBVE-24.5 EO-10 PeO (0.4 mol % of Potassium Ions, 5.5 mol % of Sodium Ions), Addition of the PeO at 132° C. to 2.1 bar The preparation was analogous to example M10, except that PeO was added at 132° C. rather than 127° C.

Example M17

HBVE-24.5 EO-10 BuO (0.4 mol % of Potassium Ions, 5.5 mol % of Sodium Ions), Addition of the BuO at 127° C. to 2.1 bar The starting material used was monomer M1 from example M1. A 2 l pressure autoclave with anchor stirrer was initially charged with 730.8 g (0.674 mol) of HBVE-22 EO and the stirrer was switched on. Thereafter, 2.97 g of 50% NaOH solution (0.0371 mol of NaOH, 0.85 g of NaOH) were added, a reduced pressure of <10 mbar was applied, and the mixture was heated to 100° C. and kept there for 80 min, in order to distill off the water.

The mixture was purged three times with $N_2$. Thereafter, the vessel was tested for pressure retention, 0.5 bar gauge (1.5 bar absolute) was set, the mixture was heated to 120° C. and then the pressure was set to 1.6 bar absolute. 74.1 g (1.685 mol) of EO were metered in up to 127° C.; $p_{max}$ was 3.9 bar absolute. After waiting for 30 min for establishment of constant pressure, the mixture was decompressed to 1.0 bar absolute.

485.3 g (6.74 mol) of BuO (butylene oxide) were metered in at 127° C.; $p_{max}$ was 2.1 bar absolute. One intermediate decompression was necessary owing to increasing fill level. The BuO metering was stopped, and the mixture was left to react for 1 h until pressure was constant and decompressed to 1.0 bar absolute. Thereafter, the metered addition of BuO was continued. $P_{max}$ was still 2.1 bar (first decompression after 246 g of BuO, total BuO metering time 10 h incl. decompression break). After metered addition of BuO had ended, reaction was allowed to continue to constant pressure or for 3 h. The mixture was cooled to 110° C., and residual oxide was drawn off until the pressure was below 10 mbar for at least 10 min. Then 0.5% water was added at 110° C. and volatiles were subsequently drawn off until the pressure was below 10 mbar for at least 10 min. The vacuum was broken with $N_2$ and 100 ppm of BHT were added. The transfer was effected at 80° C. under $N_2$.

The analysis (mass spectrum, GPC, 1H NMR in CDCl$_3$, 1H NMR in MeOD) confirmed the structure.

Example M18

HBVE-24.5 EO-12 BuO (0.4 mol % of Potassium Ions, 5.5 mol % of Sodium Ions), Addition of the BuO at 127° C. to 2.1 bar

The preparation was analogous to example M17, except that 12 rather than 10 eq of BuO were added.

Example M19

HBVE-24.5 EO-14 BuO (0.4 mol % of Potassium Ions, 5.5 mol % of Sodium Ions), Addition of the BuO at 127° C. to 2.1 bar

The preparation was analogous to example M17, except that 14 rather than 10 eq of BuO were added.

Example M20

HBVE-24.5 EO-16 BuO (0.4 mol % of Potassium Ions, 5.5 mol % of Sodium Ions), Addition of the BuO at 127° C. to 2.1 bar

The preparation was analogous to example M17, except that 16 rather than 10 eq of BuO were added.

Example M21

HBVE-24.5 EO-18 BuO (0.4 mol % of Potassium Ions, 5.5 mol % of Sodium Ions), Addition of the BuO at 127° C. to 2.1 bar

The preparation was analogous to example M17, except that 18 rather than 10 eq of BuO were added.

Example M22

HBVE-24.5 EO-16 BuO (5.8 mol % of Potassium Ions), Addition of the BuO at 127° C. to 3.1 bar

The starting material used was monomer M1 from example M1. A 2 l pressure autoclave with anchor stirrer was initially charged with 622.8 g (0.575 mol) of HBVE-22 EO and the stirrer was switched on. Thereafter, 6.92 g of 32% KOMe in MeOH solution (0.0316 mol of KOMe, 2.21 g of KOMe) were added, a reduced pressure of <10 mbar was applied, and the mixture was heated to 80° C. and kept there for 80 min, in order to distill off the methanol.

The mixture was purged three times with N$_2$. Thereafter, the vessel was tested for pressure retention, 0.5 bar gauge (1.5 bar absolute) was set, the mixture was heated to 120° C. and then the pressure was set to 1.6 bar absolute. 50.3 g (1.144 mol) of EO were metered in up to 127° C.; $p_{max}$ was 3.9 bar absolute. After waiting for 30 min for establishment of constant pressure, the mixture was decompressed to 1.0 bar absolute.

662 g (9.19 mol) of BuO were metered in at 127° C.; $p_{max}$ was 3.1 bar absolute. After metered addition of BuO had ended, reaction was allowed to continue to constant pressure or for 5 h. The mixture was cooled to 110° C., and residual oxide was drawn off until the pressure was below 10 mbar for at least 10 min. Then 0.5% water was added at 110° C. and volatiles were subsequently drawn off until the pressure was below 10 mbar for at least 10 min. The vacuum was broken with N$_2$ and 100 ppm of BHT were added. The transfer was effected at 80° C. under N$_2$.

The analysis (mass spectrum, GPC, 1H NMR in CDCl$_3$, 1H NMR in MeOD) confirmed the structure.

Example M23

HBVE-24.5 EO-16 BuO (0.4 mol % of Potassium Ions, 11 mol % of Sodium Ions), Addition of the BuO at 127° C. to 3.1 bar

The starting material used was monomer M1 from example M1. A 2 l pressure autoclave with anchor stirrer was initially charged with 595.1 g (0.549 mol) of HBVE-22 EO and the stirrer was switched on. Thereafter, 4.83 g of 50% NaOH solution (0.060 mol of NaOH, 2.41 g of NaOH) were added, a reduced pressure of <10 mbar was applied, and the mixture was heated to 100° C. and kept there for 80 min, in order to distill off the water.

The mixture was purged three times with N$_2$. Thereafter, the vessel was checked for pressure retention, 0.5 bar gauge (1.5 bar absolute) was set, the mixture was heated to 120° C. and then the pressure was set to 1.6 bar absolute. 60.4 g (1.373 mol) of EO were metered in up to 127° C.; $p_{max}$ was 3.9 bar absolute. After waiting for 30 min for establishment of constant pressure, the mixture was decompressed to 1.0 bar absolute.

632.2 g (8.748 mol) of BuO were metered in at 127° C.; $p_{max}$ was 3.1 bar absolute. One intermediate decompression was necessary owing to increasing fill level. The BuO metering was stopped, and the mixture was left to react for 1 h until pressure was constant and decompressed to 1.0 bar absolute. Thereafter, the metered addition of BuO was continued. $P_{max}$ was still 3.1 bar (first decompression after 334 g of BuO, total BuO metering time 5 h incl. decompression break). After metered addition of BuO had ended, the mixture was heated to 135° C. and reaction was allowed to continue for 3.5 h. The mixture was cooled to 100° C., and residual oxide was drawn off until the pressure was below 10 mbar for at least 10 min. Then 0.5% water was added at 120° C. and volatiles were subsequently drawn off until the pressure was below 10 mbar for at least 10 min. The vacuum was broken with N$_2$ and 100 ppm of BHT were added. The transfer was effected at 80° C. under N$_2$.

The analysis (mass spectrum, GPC, 1H NMR in CDCl$_3$, 1H NMR in MeOD) confirmed the structure.

Example M24

HBVE-23 EO-17 BuO-2.5 EO (0.4 mol % of Potassium Ions, 5.5 mol % of Sodium Ions), Addition of the BuO at 127° C. to 3.1 bar

The starting material used was monomer M1 from example M1. A 2 l pressure autoclave with anchor stirrer was initially charged with 576.7 g (0.532 mol) of HBVE-22 EO and the stirrer was switched on. Thereafter, 2.33 g of 50% NaOH solution (0.029 mol of NaOH, 1.17 g of NaOH) were added, a reduced pressure of <10 mbar was applied, and the mixture was heated to 100° C. and kept there for 80 min, in order to distill off the water.

The mixture was purged three times with N$_2$. Thereafter, the vessel was checked for pressure retention, 0.5 bar gauge (1.5 bar absolute) was set, the mixture was heated to 127° C. and then the pressure was set to 1.6 bar absolute. 23.4 g (0.532 mol) of EO were metered in at 127° C.; $p_{max}$ was 3.9 bar absolute. After waiting for 30 min for establishment of constant pressure, the mixture was decompressed to 1.0 bar absolute.

651.2 g (9.044 mol) of BuO were metered in at 127° C.; $p_{max}$ was 3.1 bar absolute. After metered addition of BuO had ended, the mixture was heated to 135° C. and reaction was allowed to continue for 2 h. Thereafter 58.5 g (1.331 mol) of EO were metered at 135° C.; $p_{max}$ was 3.2 bar absolute. After metered addition of EO had ended, the reaction was allowed to continue for 2 h.

The mixture was cooled to 100° C., and residual oxide was drawn off until the pressure was below 10 mbar for at least 10 min. Then 0.5% water was added at 120° C. and volatiles were subsequently drawn off until the pressure was below 10 mbar for at least 10 min. The vacuum was broken with $N_2$ and 100 ppm of BHT were added. The transfer was effected at 80° C. under $N_2$.

The analysis (mass spectrum, GPC, 1H NMR in $CDCl_3$, 1H NMR in MeOD) confirmed the structure.

Example M25

HBVE-24.5 EO-16 BuO-3.5 EO (0.4 mol % of Potassium Ions, 5.5 mol % of Sodium Ions), Addition of the BuO at 127° C. to 3.1 bar The starting material used was monomer M1 from example M1. A 2 l pressure autoclave with anchor stirrer was initially charged with 588.6 g (0.543 mol) of HBVE-22 EO and the stirrer was switched on. Thereafter, 2.39 g of 50% NaOH solution (0.030 mol of NaOH, 1.19 g of NaOH) were added, a reduced pressure of <10 mbar was applied, and the mixture was heated to 100° C. and kept there for 80 min, in order to distill off the water.

The mixture was purged three times with $N_2$. Thereafter, the vessel was checked for pressure retention, 0.5 bar gauge (1.5 bar absolute) was set, the mixture was heated to 127° C. and then the pressure was set to 1.6 bar absolute. 59.7 g (1.358 mol) of EO were metered in at 127° C.; $p_{max}$ was 3.9 bar absolute. After waiting for 30 min for establishment of constant pressure, the mixture was decompressed to 1.0 bar absolute.

625.5 g (8.688 mol) of BuO were metered in at 127° C.; $p_{max}$ was 3.1 bar absolute. One intermediate decompression was necessary owing to increasing fill level. The BuO metering was stopped, and the mixture was left to react for 1 h until pressure was constant and decompressed to 1.0 bar absolute. Thereafter, the metered addition of BuO was continued. $P_{max}$ was still 3.1 bar (first decompression after 610 g of BuO, total BuO metering time 8 h incl. decompression break). After metered addition of BuO had ended, the reaction was allowed to continue for 8 h and thereafter the mixture was heated to 135° C. Thereafter 83.6 g (1.901 mol) of EO were metered at 135° C.; $p_{max}$ was 3.1 bar absolute. After metered addition of EO had ended, the reaction was allowed to continue for 4 h. The mixture was cooled to 100° C., and residual oxide was drawn off until the pressure was below 10 mbar for at least 10 min. Then 0.5% water was added at 120° C. and volatiles were subsequently drawn off until the pressure was below 10 mbar for at least 10 min. The vacuum was broken with $N_2$ and 100 ppm of BHT were added. The transfer was effected at 80° C. under $N_2$.

The analysis (mass spectrum, GPC, 1H NMR in $CDCl_3$, 1H NMR in MeOD) confirmed the structure.

Example M26

HBVE-24.5 EO-16 BuO-5 EO (0.4 mol % of Potassium Ions, 5.5 mol % of Sodium Ions), Addition of the BuO at 127° C. to 3.1 bar The starting material used was monomer M1 from example M1. The preparation was analogous to example M25, except that 5 rather than 3.5 eq of EO were added after addition of BuO and polymerisation, i.e. 119.5 g (2.715 mol) of EO were metered at 135° C.

The analysis (mass spectrum, GPC, 1H NMR in $CDCl_3$, 1H NMR in MeOD) confirmed the structure.

Example M27

HBVE-24.5 EO-10 BuO-3.5 EO (0.4 mol % of Potassium Ions, 5.5 mol % of Sodium Ions), Addition of the BuO at 127° C. to 3.1 bar The starting material used was monomer M1 from example M1. A 2 l pressure autoclave with anchor stirrer was initially charged with 685.2 g (0.632 mol) of HBVE-22 EO and the stirrer was switched on. Thereafter, 2.78 g of 50% NaOH solution (0.035 mol of NaOH, 1.39 g of NaOH) were added, a reduced pressure of <10 mbar was applied, and the mixture was heated to 100° C. and kept there for 80 min, in order to distill off the water.

The mixture was purged three times with $N_2$. Thereafter, the vessel was checked for pressure retention, 0.5 bar gauge (1.5 bar absolute) was set, the mixture was heated to 127° C. and then the pressure was set to 1.6 bar absolute. 69.8 g (1.587 mol) of EO were metered in at 127° C.; $p_{max}$ was 3.9 bar absolute. After waiting for 30 min for establishment of constant pressure, the mixture was decompressed to 1.0 bar absolute.

455.2 g (6.322 mol) of BuO were metered in at 127° C.; $p_{max}$ was 3.1 bar absolute. After metered addition of BuO had ended, the reaction was allowed to continue for 7 h. Thereafter 97.4 g (2.213 mol) of EO were metered at 127° C.; $p_{max}$ was 3.1 bar absolute. After metered addition of EO had ended, the reaction was allowed to continue for 2 h. The mixture was cooled to 100° C., and residual oxide was drawn off until the pressure was below 10 mbar for at least 10 min. Then 0.5% water was added at 120° C. and volatiles were subsequently drawn off until the pressure was below 10 mbar for at least 10 min. The vacuum was broken with $N_2$ and 100 ppm of BHT were added. The transfer was effected at 80° C. under $N_2$.

The analysis (mass spectrum, GPC, 1H NMR in $CDCl_3$, 1H NMR in MeOD) confirmed the structure.

Example M28

HBVE-24.5 EO-5 BuO-3.5 EO (0.4 mol % of Potassium Ions, 5.5 mol % of Sodium Ions), Addition of the BuO at 127° C. to 3.1 bar The starting material used was monomer M1 from example M1. A 2 l pressure autoclave with anchor stirrer was initially charged with 822.0 g (0.758 mol) of HBVE-22 EO and the stirrer was switched on. Thereafter, 3.34 g of 50% NaOH solution (0.042 mol of NaOH, 1.67 g of NaOH) were added, a reduced pressure of <10 mbar was applied, and the mixture was heated to 100° C. and kept there for 80 min, in order to distill off the water.

The mixture was purged three times with $N_2$. Thereafter, the vessel was checked for pressure retention, 0.5 bar gauge (1.5 bar absolute) was set, the mixture was heated to 127° C. and then the pressure was set to 1.6 bar absolute. 83.4 g (1.895 mol) of EO were metered in at 127° C.; $p_{max}$ was 3.9 bar absolute. After waiting for 30 min for establishment of constant pressure, the mixture was decompressed to 1.0 bar absolute.

273.0 g (3.792 mol) of BuO were metered in at 127° C.; $p_{max}$ was 3.1 bar absolute. After metered addition of BuO had ended, the reaction was allowed to continue for 15 h. Thereafter 116.8 g (2.654 mol) of EO were metered at 127° C.; $p_{max}$ was 3.1 bar absolute. After metered addition of EO had ended, the reaction was allowed to continue for 4 h. The mixture was cooled to 100° C., and residual oxide was drawn off until the pressure was below 10 mbar for at least 10 min. Then 0.5% water was added at 120° C. and volatiles were subsequently drawn off until the pressure was below 10 mbar for at least 10 min. The vacuum was broken with $N_2$ and 100 ppm of BHT were added. The transfer was effected at 80° C. under $N_2$.

The analysis (mass spectrum, GPC, 1H NMR in $CDCl_3$, 1H NMR in MeOD) confirmed the structure.

Example M29

HBVE-24.5 EO-22 BuO-3.5 EO (0.4 mol % of Potassium Ions, 5.5 mol % of Sodium Ions), Addition of the BuO at 127° C. to 3.1 bar The starting material used was monomer M1 from example M1. A 2 l pressure autoclave with anchor stirrer was initially charged with 493.3 g (0.455 mol) of HBVE-22 EO and the stirrer was switched on. Thereafter, 2.00 g of 50% NaOH solution (0.025 mol of NaOH, 1.00 g of NaOH) were added, a reduced pressure of <10 mbar was applied, and the mixture was heated to 100° C. and kept there for 80 min, in order to distill off the water.

The mixture was purged three times with $N_2$. Thereafter, the vessel was checked for pressure retention, 0.5 bar gauge (1.5 bar absolute) was set, the mixture was heated to 127° C. and then the pressure was set to 1.6 bar absolute. 50.0 g (1.138 mol) of EO were metered in at 127° C.; $p_{max}$ was 3.9 bar absolute. After waiting for 30 min for establishment of constant pressure, the mixture was decompressed to 1.0 bar absolute.

720.9 g (10.012 mol) of BuO were metered in at 127° C.; $p_{max}$ was 3.1 bar absolute. After metered addition of BuO had ended, the reaction was allowed to continue for 9 h. The mixture was heated to 135° C. Thereafter 70.1 g (1.593 mol) of EO were metered at 135° C.; $p_{max}$ was 3.1 bar absolute. After metered addition of EO had ended, the reaction was allowed to continue for 2 h. The mixture was cooled to 100° C., and residual oxide was drawn off until the pressure was below 10 mbar for at least 10 min. Then 0.5% water was added at 120° C. and volatiles were subsequently drawn off until the pressure was below 10 mbar for at least 10 min. The vacuum was broken with $N_2$ and 100 ppm of BHT were added. The transfer was effected at 80° C. under $N_2$.

The analysis (mass spectrum, GPC, 1H NMR in $CDCl_3$, 1H NMR in MeOD) confirmed the structure.

Example M30

HBVE-24.5 EO-16 BuO-3.5 EO (0.4 mol % of potassium ions, 5.5 mol % of sodium ions), addition of the BuO at 127° C. at from 4 to 6 bar The starting material used was monomer M1 from example M1. A 2 l pressure autoclave with anchor stirrer was initially charged with 568.6 g (0.525 mol) of HBVE-22 EO and the stirrer was switched on. Thereafter, 2.31 g of 50% NaOH solution (0.029 mol of NaOH, 1.16 g of NaOH) were added, a reduced pressure of <10 mbar was applied, and the mixture was heated to 100° C. and kept there for 80 min, in order to distill off the water.

The mixture was purged three times with $N_2$. Thereafter, the vessel was checked for pressure retention, 0.5 bar gauge (1.5 bar absolute) was set, the mixture was heated to 127° C. and then the pressure was set to 3 bar absolute. 57.7 g (1.311 mol) of EO were metered in at 127° C.; $p_{max}$ was 6 bar absolute. After waiting for 30 min for establishment of constant pressure, the mixture was decompressed to 4.0 bar absolute.

604.2 g (8.392 mol) of BuO were metered in at 127° C.; $p_{max}$ was 6 bar absolute. One intermediate decompression was necessary owing to increasing fill level. The BuO metering was stopped, and the mixture was left to react for 1 h until pressure was constant and decompressed to 4.0 bar absolute. Thereafter, the metered addition of BuO was continued. $P_{max}$ was still 6 bar (first decompression after 505 g of BuO, total BuO metering time 11 h incl. decompression break). After metered addition of BuO had ended, the reaction was allowed to continue for 6 h at 127° C. It was decompressed to 4 bar absolute.

Thereafter 80.8 g (1.836 mol) of EO were metered at 127° C.; $p_{max}$ was 6 bar absolute. After metered addition of EO had ended, the reaction was allowed to continue for 4 h. The mixture was cooled to 100° C., and residual oxide was drawn off until the pressure was below 10 mbar for at least 10 min. About 1400 ppm of volatile components were removed. Then 0.5% water was added at 120° C. and volatiles were subsequently drawn off until the pressure was below 10 mbar for at least 10 min. The vacuum was broken with $N_2$ and 100 ppm of BHT were added. The transfer was effected at 80° C. under $N_2$.

The analysis (mass spectrum, GPC, 1H NMR in $CDCl_3$, 1H NMR in MeOD) confirmed the structure.

I-b Preparation of the Copolymers Based on Macromonomers (M2-M30)

Example C1

General Preparation of a Copolymer from 2% by Weight of Macromonomer M, 50% by Weight of Acrylamide and 48% by Weight of 2-acrylamido-2-methylpropanesulfonic acid A plastic bucket with a magnetic stirrer, pH meter and thermometer was initially charged with 121.2 g of a 50% aqueous solution of NaATBS (2-acrylamido-2-methylpropanesulfonic acid, Na salt), followed by successive addition of 155 g of distilled water, 0.6 g of a defoamer (Surfynol® DF-58), 0.2 g of a silicone defoamer (Baysilon® EN), 2.3 g of monomer M, 114.4 g of a 50% aqueous solution of acrylamide, 1.2 g of pentasodium diethylenetriaminepentaacetate (complexing agent, as a 5% aqueous solution) and 2.4 g of a nonionic surfactant (isotridecanol, alkoxylated with 15 units of ethylene oxide).

After adjusting the pH with a 20% or 2% sulfuric acid solution to a value of 6 and adding the rest of the water, the monomer solution was adjusted to the start temperature of 5° C. The total amount of the water was such that—after the polymerization—a solids concentration of approx. 30 to 36% by weight was attained. The solution was transferred into a thermos flask, a temperature sensor was provided for temperature recording and the solution was purged with $N_2$ for 30 minutes. The polymerization was subsequently initiated by addition of 1.6 ml of a 10% aqueous solution of a water-soluble cationic azo initiator 2,2'-azobis(2-amidinopropane)dihydrochloride (Wako V-50), 0.12 ml of a 1% aqueous solution of tert-butyl hydroperoxide and 0.24 ml of a 1% sodium sulfite solution. After the initiators had been added, the temperature rose to approx. 80° C. within 15 to 30 min. After 30 min, the reaction vessel was placed in a drying cabinet at approx. 80° C. for approx. 2 h to complete the polymerization. The total polymerization time was approx. 2 h to 2.5 h.

A gel block was obtained, which, after the polymerization had ended, was comminuted with a meat grinder. The gel granules thus obtained were dried in a fluidized bed drier at 55° C. for two hours. Hard white granules were obtained, which were converted to a pulverulent state by means of a centrifugal mill. A copolymer was obtained with a weight-average molecular weight of about 1 000 000 g/mol to 30 000 000 g/mol.

Example C2

Copolymer Based on Macromonomer

The copolymer was obtained according to the above general preparation method by using macromonomer from comparative example M2.

Examples C3 to C30

Copolymers C3 to C30 were prepared by the above general method by using the respective monomers M3 to M30.

PART II: PERFORMANCE TESTS

The resulting copolymers based on the above macromonomers were used to conduct the tests which follow, in order to assess the suitability thereof for tertiary mineral oil production.

Description of the Test Methods a) Determination of Solubility

The copolymers were dissolved in synthetic seawater to DIN 50900 (salt content 35 g/l) so as to give a polymer concentration of 2000 ppm: 0.5 g of the respective copolymer was stirred in 249 g of synthetic seawater (DIN 50900) for 24 h until complete dissolution (the precision glass stirrer used should preferably be a paddle stirrer; the polymer was scattered gradually into the vortex which forms).

b) Determination of Viscosity

The viscosities of the abovementioned copolymer solutions were determined using a Haake rheometer with double gap geometry at 7 Hz and 60° C. After approx. 5 min, a plateau value was established for the viscosity, which was read off. Very good values were considered to be viscosities greater than or equal 150 mPas (2000 ppm of copolymer in synthetic seawater at 60° C. and 7 Hz). Good values were considered to be viscosities greater of 120 mPas to 149 mPas. Moderate viscosity values were considered to be from 80 to 119 mPas. Viscosities of less than 80 mPas were considered to be poor.

c) Determination of Filterability

Prior to the actual filtration test, the polymer solution was filtered through a 200 μm Retsch sieve to determine the gel content thereof.

The filtration test to determine the MPFR value—the ratio of the flow rate of the first quarter to that of the fourth quarter is called the "Millipore filter ratio" (MPFR)—was conducted by means of a Sartorius 16249 pressure filtration cell (filter diameter 47 mm) and an Isopore polycarbonate membrane filter (diameter 47 mm, pore size 3 μm) at room temperature and 1 bar gauge. 210-220 g of polymer solution were used. In the test, at least 180 g of filtrate were to pass through within 30 minutes. Good values were considered to be MPFR of less than or equal to 1.3. If they are between 1.3 and 1.6, filterability was considered to be moderate. If less than 30 g of filtrate passed through, the sample was considered to be unfilterable.

d) Determination of the Gel Content 1 g of the respective copolymer from preparation examples 2-30 was stirred in 249 g of synthetic seawater to DIN 50900 (salt content 35 g/l) until complete dissolution for 24 h. Subsequently, the solution was filtered through a sieve of mesh size 200 μm and the volume of the residue remaining on the sieve was measured. The value obtained corresponds to the gel content.

Test Results:

The test results are compiled in the table which follows.

| Example | Copolymer | soluble | Viscosity | Filterability | Gel content |
|---|---|---|---|---|---|
| 2 | C2 based on M2 HBVE - 22 EO - 10.6 PeO (0.4 mol % of potassium ions, 4.6 mol % of sodium ions), addition of the PeO at 140° C. to 3.2 bar | yes | good | good | 0 ml |
| 3 | C3 based on M3 HBVE - 22 EO - 10.5 PeO (0.4 mol % of potassium ions, 3.3 mol % of sodium ions), addition of the PeO at 140° C. to 2.1 bar | yes | good | unfilterable | 2 ml |
| 4 | C4 based on M4 HBVE - 22 EO - 10 PeO (0.4 mol % of potassium ions, 4.6 mol % of sodium ions), addition of the PeO at 127° C. to 2.1 bar | yes | good | good | 0 ml |
| 5 | C5 based on M5 HBVE - 22 EO - 11 PeO (0.4 mol % of potassium ions, 4.6 mol % of sodium ions), addition of the PeO at 127° C. to 2.1 bar | yes | good | unfilterable | 12 ml |

-continued

| Example | Copolymer | soluble | Viscosity | Filterability | Gel content |
|---|---|---|---|---|---|
| 6 | C6 based on M6<br>HBVE - 24.5 EO - 11 PeO (0.4 mol % of potassium ions, 4.6 mol % of sodium ions), addition of the PeO at 127° C. to 2.1 bar | yes | good | good | 0 ml |
| 7 | C7 based on M7<br>HBVE - 24.5 EO - 10 PeO (0.4 mol % of potassium ions, 4.6 mol % of sodium ions), addition of the PeO at 127° C. to 2.1 bar | yes | good | good | 0 ml |
| 8 | C8 based on M8<br>HBVE - 24.5 EO - 10 PeO (0.9 mol % of potassium ions, 4.1 mol % of sodium ions), addition of the PeO at 127° C. to 2.1 bar | yes | good | moderate | 0-1 ml |
| 9 | C9 based on M9<br>HBVE - 24.5 EO - 10 PeO (1.5 mol % of potassium ions, 4.6 mol % of sodium ions), addition of the PeO at 127° C. to 2.1 bar | yes | good | unfilterable | 3 ml |
| 10 | C10 based on M10<br>HBVE - 24.5 EO - 10 PeO (0.4 mol % of potassium ions, 5.5 mol % of sodium ions), addition of the PeO at 127° C. to 2.1 bar | yes | good | good | 0 ml |
| 11 | C11 based on M11<br>HBVE - 24.5 EO - 9 PeO (0.4 mol % of potassium ions, 5.5 mol % of sodium ions), addition of the PeO at 127° C. to 2.1 bar | yes | good | good | 0 ml |
| 12 | C12 based on M12<br>HBVE - 24.5 EO - 9 PeO (5.8 mol % of potassium ions), addition of the PeO at 127° C. to 2.1 bar | yes | good | unfilterable | 48 ml |
| 13 | C13 based on M13<br>HBVE - 24.5 EO - 8 PeO (0.4 mol % of potassium ions, 4.6 mol % of sodium ions), addition of the PeO at 127° C. to 2.1 bar | yes | good | moderate | 0-1 ml |
| 14 | C14 based on M14<br>HBVE - 26.5 EO - 10 PeO (0.4 mol % of potassium ions, 5.5 mol % of sodium ions), addition of the PeO at 127° C. to 2.1 bar | yes | good | moderate | 0-1 ml |
| 15 | C15 based on M15<br>HBVE - 24.5 EO - 10 PeO (0.4 mol % of potassium ions, 5.5 mol % of sodium ions), addition of the PeO at 122° C. to 2.1 bar | yes | good | good | 0 ml |
| 16 | C16 based on M16<br>HBVE - 24.5 EO - 10 PeO (0.4 mol % of potassium ions, 5.5 mol % of sodium ions), addition of the PeO at 132° C. to 2.1 bar | yes | good | good | 0 ml |
| 17 | C17 based on M17<br>HBVE - 24.5 EO - 10 BuO (0.4 mol % of potassium ions, 5.5 mol % of sodium ions), addition of the BuO at 127° C. to 2.1 bar | yes | poor | good | 0 ml |
| 18 | C18 based on M18<br>HBVE - 24.5 EO - 12 BuO (0.4 mol % of potassium ions, 5.5 mol % of sodium ions), addition of the BuO at 127° C. to 2.1 bar | yes | poor | good | 0 ml |
| 19 | C19 based on M19<br>HBVE - 24.5 EO - 14 BuO (0.4 mol % of potassium ions, 5.5 mol % of sodium ions), addition of the BuO at 127° C. to 2.1 bar | yes | good | good | 0 ml |
| 20 | C20 based on M20<br>HBVE - 24.5 EO - 16 BuO (0.4 mol % of potassium ions, 5.5 mol % of sodium ions), addition of the BuO at 127° C. to 2.1 bar | yes | good | good | 0 ml |
| 21 | C21 based on M21<br>HBVE - 24.5 EO - 18 BuO (0.4 mol % of potassium ions, 5.5 | yes | good | unfilterable | 2 ml |

-continued

| Example | Copolymer | soluble | Viscosity | Filterability | Gel content |
|---|---|---|---|---|---|
| | mol % of sodium ions), addition of the BuO at 127° C. to 2.1 bar | | | | |
| 22 | C22 based on M22 HBVE - 24.5 EO - 16 BuO (5.8 mol % of potassium ions, addition of the BuO at 127° C. to 3.1 bar | yes | good | unfilterable | 5-10 ml |
| 23 | C23 based on M23 HBVE - 24.5 EO - 16 BuO (0.4 mol % potassium ions, 11 mol % sodium ions), addition of the BuO at 127° C. to 3.1 bar | yes | good | good | 0 ml |
| 24 | C24 based on M24 HBVE - 23 EO - 17 BuO - 2.5 EO (0.4 mol % potassium ions, 5.5 mol % sodium ions), addition of the BuO at 127° C. to 3.1 bar | yes | very good | good | 0 ml |
| 25 | C25 based on M25 HBVE - 24.5 EO - 16 BuO - 3.5 EO (0.4 mol % potassium ions, 5.5 mol % sodium ions), addition of the BuO at 127° C. to 3.1 bar | yes | very good | good | 0 ml |
| 26 | C26 based on M26 HBVE - 24.5 EO - 16 BuO - 5 EO (0.4 mol % potassium ions, 5.5 mol % sodium ions), addition of the BuO at 127° C. to 3.1 bar | yes | very good | good | 0 ml |
| 27 | C27 based on M27 HBVE - 24.5 EO - 10 BuO - 3.5 EO (0.4 mol % potassium ions, 5.5 mol % sodium ions), addition of the BuO at 127° C. to 3.1 bar | yes | moderate | good | 0 ml |
| 28 | C28 based on M28 HBVE - 24.5 EO - 5 BuO - 3.5 EO (0.4 mol % potassium ions, 5.5 mol % sodium ions), addition of the BuO at 127° C. to 3.1 bar | yes | moderate | good | 0 ml |
| 29 | C29 based on M29 HBVE - 24.5 EO - 22 BuO - 3.5 EO (0.4 mol % potassium ions, 5.5 mol % sodium ions), addition of the BuO at 127° C. to 3.1 bar | yes | very good | very good | 0 ml |
| 30 | C30 based on M30 HBVE - 24.5 EO - 16 BuO - 3.5 EO (0.4 mol % potassium ions, 5.5 mol % sodium ions), addition of the BuO at 127° C. at 4 to 6 bar | yes | very good | good | 0 ml |

Examples 2 and 3 show that the pressure window for the PeO metering at 140° C. has a great influence on the product quality. A larger pressure window enables rapid metering and a short cycle time (2 h for PeO). If, however, the pressure window required by the safety specifications is observed, as in example 3, the reaction is prolonged (2 days for PeO). As a result of the high temperature, there are side reactions and formation of crosslinkers, the effect of which is that the later copolymerization forms a thickening copolymer which is no longer filterable, and this is no longer employable for uses in a porous matrix (for example mineral oil-bearing rock strata, thickeners in mineral oil production).

Example 4 shows that lowering the reaction temperature while maintaining the small pressure window can produce copolymers free of crosslinkers. As can be seen in the examples, the concentration of potassium ions is of central significance. As examples 9 and 12 show, above 0.9 mol % of potassium ions, the polymer is no longer filterable in spite of temperatures of 127° C. in the PeO metering. A potassium ion concentration greater than 0.9 mol % apparently leads to the formation of crosslinking compounds which lead to a copolymer which is no longer filterable. In addition, the exact content of sodium ion catalyst appears also to play an important role.

It is additionally considered to be surprising that the hydrophilic/hydrophobic ratio of the macromonomer is also of great significance. In spite of crosslinker-free operation, the copolymer according to example 5 has somewhat poorer filterability than copolymers based on macromonomers with only 1 eq of PeO less (example 4). If monomers with 24.5 units of EO are used, the variation in the PeO units has no influence on the filterability of the copolymers (comparison of examples 6 and 7 and comparison of examples 10 and 11). The specific selection of a hydrophilic/hydrophobic ratio, i.e. ratio of EO and PeO units, led to surprising robustness of the process. In examples 10 and 11 (24.5 EO units), no variation in the PeO content was perceptible. This gives good stability for industrial scale production, where variations of less than 1 eq of alkylene oxide are not easy to guarantee. Deviations in process and structure are thus much better tolerated in the later copolymer synthesis or application.

A similar picture is found in the case of copolymers based on macromonomers M with terminal BuO groups. A comparison of examples 20 and 22 shows that, in the case of preparation of copolymers based on macromonomers with terminal BuO groups too, a concentration of potassium ions of less than 0.9 mol % surprisingly leads to improved copolymers. Excessively high values for potassium ions in the copolymer lead to unfilterable structures.

Examples 19 and 20 show that optimal product properties (good viscosities and good filterability) can be achieved especially at a butoxylation level above 12 and below 18. A comparison of the results relating to macromonomers with terminal PeO groups and relating to macromonomers with terminal BuO groups has additionally shown that the total number of carbon atoms in the side chains of the macromonomers, especially in the terminal alkylene oxide blocks, is of crucial significance for the properties of the resulting copolymers. For example, the total number of carbon atoms in the side chains of the terminal alkylene oxide block from examples 19 and 20 (total of 28 to 32 carbon atoms in side chains) coincides with the total number range in examples 6, 10 and 11 (total of 27 to 33 carbon atoms in side chains) relating to macromonomers with terminal PeO groups. Other butoxylation levels as in examples 17, 18 and 21 lead to properties of the macromonomer which are no longer optimal in all areas.

Further, it has been shown that macromonomers with BuO blocks, in particular with blocks having 16 to 22 BuO units, can advantageously be modified with an terminal EO block. Thus, copolymers with very good viscosity properties and good filterability can be obtained (examples 24 to 26 and 29). Contrary, it seems that the introduction of an terminal EO block in macromonomers having an BuO block with less than 12 BuO units do not result in an advantageous effect (examples 27 and 28).

Example 23 shows that the concentration of sodium ions can be up to at least 11 mol % during the addition of butylene oxide.

Example 30 shows that the addition of butylene oxide can also advantageously be carried out at a pressure in the range of 4 to 6 bar.

The invention claimed is:

1. A process for preparing a macromonomer M of the general formula (I)

$$H_2C=C(R^1)-R^2-O-(-CH_2-CH_2-O-)_k-(-CH_2-CH(R^3)-O-)_l-(-CH_2-CH_2-O-)_m-R^4 \quad (I)$$

where the $(-CH_2-CH_2-O-)_k$ and $(-CH_2-CH(R^3)-O-)_l$ and optionally $-(-CH_2-CH_2-O-)_m$ units are arranged in block structure in the sequence shown in formula (I);
where the radicals and indices are each defined as follows:
k: is a number from 10 to 150;
l: is a number from 5 to 25;
m: is a number from 0 to 15;
$R^1$: is H or methyl;
$R^2$: is independently a single bond or a divalent linking group selected from the group consisting of $-(C_nH_{2n})-$ and $-O-(C_{n'}H_{2n'})-$, where n is a natural number from 1 to 6 and n' is a natural number from 2 to 6;
$R^3$: is independently a hydrocarbyl radical having at least 2 carbon atoms or an ether group of the general formula $-CH_2-O-R^{3'}$ where $R^{3'}$ is a hydrocarbyl radical having at least 2 carbon atoms; with the proviso that the sum total of carbon atoms in all hydrocarbyl radicals $R^3$ or $R^{3'}$ is in the range from 25.5 to 34.5;
$R^4$ is independently H or a hydrocarbyl radical having 1 to 4 carbon atoms;
comprising the steps of a) reacting a monoethylenically unsaturated alcohol A1 of the general formula (II)

$$H_2C=C(R^1)-R^2-OH \quad (II)$$

with ethylene oxide, where the $R^1$ and $R^2$ radicals are each as defined above;
with addition of an alkaline catalyst C1 comprising KOMe and/or NaOMe to obtain an alkoxylated alcohol A2;

b) reacting the alkoxylated alcohol A2 with at least one alkylene oxide Z of the formula (Z)

$$\overset{O}{\underset{R^3}{\triangle}} \quad (Z)$$

where $R^3$ is as defined above;
with addition of an alkaline catalyst C2;
where the concentration of potassium ions in the reaction in step b) is in the range from 0.01 to 0.5 mol %, based on the alcohol A2 used;
and where the reaction in step b) is performed at a temperature less than or equal to 135° C.,
to obtain an alkoxylated alcohol A3 of the formula (III)

$$H_2C=C(R^1)-R^2-O-(-CH_2-CH_2-O-)_k-(-CH_2-CH(R^3)-O-)_l-R^4 \quad (III)$$

where $R^4$=H, where the $R^1$, $R^2$ and $R^3$ radicals and the indices k and l are each as defined above;

c) optionally reacting at least a portion of the alkoxylated alcohol A3 with ethylene oxide to obtain an alkoxylated alcohol A4 corresponding to the macromonomer M of the formula (I) where $R^4$=H and m is greater than 0;

d) optionally etherifying the alkoxylated alcohol A3 and/or A4 with a compound $$R^4-X$$

where $R^4$ is as defined above and X is a leaving group;
to obtain a macromonomer M of the formula (I) and/or (III) where $R^4$=hydrocarbyl radical having 1 to 4 carbon atoms.

2. The process for preparing a macromonomer M according to claim 1, wherein the alkaline catalyst C2 comprises at least one basic sodium compound.

3. The process for preparing a macromonomer M according to claim 1, wherein a catalyst C2 comprising at least one basic sodium compound is used in step b), the concentration of sodium ions in the reaction in step b) being in the range from 3.5 to 12 mol %, based on the alcohol A2 used.

4. The process for preparing a macromonomer M according to claim 1, wherein step b) is performed at temperatures of 120 to 135° C.

5. The process for preparing a macromonomer M according to claim 1, wherein step b) comprises the addition of the at least one alkylene oxide Z to a mixture of alcohol A2 and alkaline catalyst C2 at a pressure in the range from 1 to 3.1 bar.

6. The process for preparing a macromonomer M according to claim 1, wherein $R^3$ is a hydrocarbyl radical having 2 carbon atoms and step b) comprises the addition of the at least one alkylene oxide Z to a mixture of alcohol A2 and alkaline catalyst C2 at a pressure in the range from 1 to 3.1 bar, or $R^3$ is a hydrocarbyl radical having at least 3 carbon atoms and step b) comprises the addition of the at least one alkylene oxide Z to a mixture of alcohol A2 and alkaline catalyst C2 at a pressure in the range from 1 to 2.1 bar.

7. The process for preparing a macromonomer according to claim 1, wherein k is a number from 23 to 26.

8. The process for preparing a macromonomer according to claim 1, wherein the radicals and indices are each defined as follows:
k: is a number from 20 to 28;
l: is a number from 5 to 25;
m: is a number from 0 to 15;
$R^1$: is H;
$R^2$: is independently a divalent linking group —O—$(C_{n'}H_{2n'})$— where n' is a natural number from 3 to 5,
$R^3$: is independently a hydrocarbyl radical having 2 to 4 carbon atoms, with the proviso that the sum total of the carbon atoms in all hydrocarbyl radicals $R^3$ or $R^{3'}$ is in the range from 25.5 to 34.5;
$R^4$: is H.

9. The process for preparing a macromonomer according to claim 1, wherein the radicals and indices are each defined as follows:
k: is a number from 23 to 26;
l: is a number from 5 to 25;
m: is a number from 0 to 15;
$R^1$: is H;
$R^2$: is independently a divalent linking group —O—$(C_{n'}H_{2n'})$— where n' is a natural number from 3 to 5,
$R^3$: is independently a hydrocarbyl radical having 2 to 4 carbon atoms, with the proviso that the sum total of the carbon atoms in all hydrocarbyl radicals $R^3$ or $R^{3'}$ is in the range from 25.5 to 34.5;
$R^4$: is H.

10. The process for preparing a macromonomer according to claim 1, wherein the radicals and indices are each defined as follows:
k: is a number from 23 to 26;
l: is a number from 7.5 to 25;
m: is a number from 0 to 15;
$R^1$: is H;
$R^2$: is independently a divalent linking group —O—$(C_{n'}H_{2n'})$— where n' is a natural number from 3 to 5,
$R^3$: is ethyl;
$R^4$: is H.

11. The process for preparing a macromonomer according to claim 1, wherein the radicals and indices are each defined as follows:
k: is a number from 23 to 26;
l: is a number from 8.5 to 11.5;
m: is a number from 0 to 15;
$R^1$: is H;
$R^2$: is independently a divalent linking group —O—$(C_{n'}H_{2n'})$— where n' is a natural number from 3 to 5,
$R^3$: is n-propyl;
$R^4$: is H.

12. The process for preparing a macromonomer according to claim 1, wherein the macromonomer M is a mixture of a macromonomer M of the formula (I) where m=0 and a macromonomer M of the formula (I) where m=1 to 15.

13. The process for preparing a macromonomer according to claim 12, wherein the weight ratio of the macromonomer of the formula (I) where m=0 and the macromonomer of the formula (I) where m=1 to 15 is in the range from 19:1 to 1:19.

14. A macromonomer M of the general formula (I)

$$H_2C=C(R^1)-R^2-O-(-CH_2-CH_2-O-)_k-(-CH_2-CH(R^3)-O-)_l-(-CH_2-CH_2-O-)_m-R^4 \quad (I)$$

where the $(-CH_2-CH_2-O-)_k$ and $(-CH_2-CH(R^3)-O-)_l$ and optionally $-(-CH_2-CH_2-O-)_m$ units are arranged in block structure in the sequence shown in formula (I);
where the radicals and indices are each defined as follows:
k: is a number from 20 to 28;
l: is a number from 5 to 25;
m: is a number from 0 to 15;
$R^1$: is H or methyl;
$R^2$: is independently a single bond or a divalent linking group selected from the group consisting of —$(C_nH_{2n})$— and —O—$(C_{n'}H_{2n'})$—, where n is a natural number from 1 to 6 and n' is a natural number from 2 to 6;
$R^3$: is independently a hydrocarbyl radical having at least 2 carbon atoms, with the proviso that the sum total of the carbon atoms in all hydrocarbyl radicals $R^3$ is in the range from 25.5 to 34.5;
$R^4$: is independently H or a hydrocarbyl radical having 1 to 4 carbon atoms;
obtained by the process according to claim 1.

15. A macromonomer M according to claim 14, wherein the radicals and indices of the formula (I) are each defined as follows:
k: is a number from 23 to 26;
l: is a number from 5 to 25;
m: is a number from 0 to 15;
$R^1$: is H or methyl;
$R^2$: is independently a single bond or a divalent linking group selected from the group consisting of —$(C_nH_{2n})$— and —O—$(C_{n'}H_{2n'})$—, where n is a natural number from 1 to 6 and n' is a natural number from 2 to 6;
$R^3$: is independently a hydrocarbyl radical having at least 2 carbon atoms, with the proviso that the sum total of the carbon atoms in all hydrocarbyl radicals $R^3$ is in the range from 25.5 to 34.5;
$R^4$: is independently H or a hydrocarbyl radical having 1 to 4 carbon atoms.

16. A macromonomer M according to claim 14, wherein the radicals and indices of the formula (I) are each defined as follows:
k: is a number from 23 to 26;
l: is a number from 5 to 25;
m: is a number from 0 to 15;
$R^1$: is H;
$R^2$: is independently a divalent linking group —O—$(C_{n'}H_{2n'})$— where n' is a natural number from 3 to 5,
$R^3$: is independently a hydrocarbyl radical having 2 to 4 carbon atoms, with the proviso that the sum total of the carbon atoms in all hydrocarbyl radicals $R^3$ is in the range from 25.5 to 34.5;
$R^4$: is H.

17. A macromonomer M of the general formula (I)

$$H_2C=C(R^1)-R^2-O-(-CH_2-CH_2-O-)_k-(-CH_2-CH(R^3)-O-)_l-(-CH_2-CH_2-O-)_m-R^4 \quad (I)$$

where the $(-CH_2-CH_2-O-)_k$ and $(-CH_2-CH(R^3)-O-)_l$ and optionally $-(-CH_2-CH_2-O-)_m$ units are arranged in block structure in the sequence shown in formula (I);
where the radicals and indices are each defined as follows:
k: is a number from 20 to 28;
l: is a number from 5 to 25;
m: is a number from 0.1 to 15;

$R^1$: is H or methyl;

$R^2$: is independently a single bond or a divalent linking group selected from the group consisting of —($C_nH_{2n}$)— and —O—($C_nH_{2n'}$)—, where n is a natural number from 1 to 6 and n' is a natural number from 2 to 6;

$R^3$: is independently a hydrocarbyl radical having at least 2 carbon atoms, with the proviso that the sum total of the carbon atoms in all hydrocarbyl radicals $R^3$ is in the range from 15 to 50;

$R^4$: is independently H or a hydrocarbyl radical having 1 to 4 carbon atoms.

18. A macromonomer M of the general formula (I)

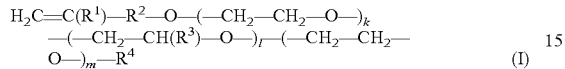

$$H_2C=C(R^1)-R^2-O-(-CH_2-CH_2-O-)_k-(-CH_2-CH(R^3)-O-)_l-(-CH_2-CH_2-O-)_m-R^4 \quad (I)$$

where the (—$CH_2$—$CH_2$—O—)$_k$ and (—$CH_2$—CH($R^3$)—O—)$_l$ and optionally —(—$CH_2$—$CH_2$—O—)$_m$ units are arranged in block structure in the sequence shown in formula (I);

where the radicals and indices are each defined as follows:

k: is a number from 10 to 150;

l: is a number from 5 to 25;

m: is a number from 0.1 to 15;

$R^1$: is H or methyl;

$R^2$: is independently a single bond or a divalent linking group selected from the group consisting of —($C_nH_{2n}$)— and —O—($C_nH_{2n'}$)—, where n is a natural number from 1 to 6 and n' is a natural number from 2 to 6;

$R^3$: is independently a hydrocarbyl radical having 2 to 4 carbon atoms or an ether group of the general formula —$CH_2$—O—$R^{3'}$ where $R^{3'}$ is a hydrocarbyl radical having at least 2 carbon atoms, with the proviso that the sum total of the carbon atoms in all hydrocarbyl radicals $R^{3'}$ is in the range from 15 to 50;

$R^4$: is independently H or a hydrocarbyl radical having 1 to 4 carbon atoms.

\* \* \* \* \*